United States Patent
Sugio et al.

(10) Patent No.: US 9,560,352 B2
(45) Date of Patent: Jan. 31, 2017

(54) IMAGE CODING METHOD AND IMAGE DECODING METHOD

(75) Inventors: Toshiyasu Sugio, Osaka (JP); Takahiro Nishi, Nara (JP); Youji Sibahara, Osaka (JP); Hisao Sasai, Osaka (JP)

(73) Assignee: SUN PATENT TRUST, New York, NY (US)

( * ) Notice: Subject to any disclaimer, the term of this patent is extended or adjusted under 35 U.S.C. 154(b) by 687 days.

(21) Appl. No.: 13/980,918

(22) PCT Filed: Jan. 26, 2012

(86) PCT No.: PCT/JP2012/000491
§ 371 (c)(1),
(2), (4) Date: Jul. 22, 2013

(87) PCT Pub. No.: WO2012/102045
PCT Pub. Date: Aug. 2, 2012

(65) Prior Publication Data
US 2013/0301736 A1    Nov. 14, 2013

(51) Int. Cl.
*H04N 7/12* (2006.01)
*H04N 19/51* (2014.01)
(Continued)

(52) U.S. Cl.
CPC ...... *H04N 19/00587* (2013.01); *H04N 19/109* (2014.11); *H04N 19/119* (2014.11);
(Continued)

(58) Field of Classification Search
CPC  H04N 19/00587; H04N 19/52; H04N 19/176; H04N 19/119; H04N 19/147; H04N 19/61; H04N 19/109; H04N 19/137
See application file for complete search history.

(56) References Cited

U.S. PATENT DOCUMENTS

2004/0086044 A1    5/2004  Kondo et al.
2004/0234143 A1   11/2004  Hagai et al.
(Continued)

FOREIGN PATENT DOCUMENTS

JP    2004-088737    3/2004

OTHER PUBLICATIONS

Tourapis, Alexis M., Feng Wu, and Shipeng Li. "Direct mode coding for bipredictive slices in the H. 264 standard." Circuits and Systems for Video Technology, IEEE Transactions on 15.1 (2005): 119-126.*

(Continued)

*Primary Examiner* — Allen Wong
(74) *Attorney, Agent, or Firm* — Wenderoth, Lind & Ponack, L.L.P.

(57) ABSTRACT

An image coding method of coding a current block to be coded using a first reference index indicating a first reference picture and a first motion vector, includes: calculating, using a second reference index and a second motion vector used to code a corresponding block, a third reference index and a third motion vector as respective candidates for the first reference index and the first motion vector; determining a value of a flag that indicates whether or not to code the current block using the third reference index and the third motion vector as the first reference index and the first motion vector; and coding the current block using the first reference index and the first motion vector according to the value of the flag, and adding the value of the flag to a bitstream generated by the coding.

6 Claims, 35 Drawing Sheets

(51) Int. Cl.

| | |
|---|---|
| H04N 19/52 | (2014.01) |
| H04N 19/176 | (2014.01) |
| H04N 19/119 | (2014.01) |
| H04N 19/147 | (2014.01) |
| H04N 19/61 | (2014.01) |
| H04N 19/109 | (2014.01) |
| H04N 19/137 | (2014.01) |

(52) U.S. Cl.
CPC ......... *H04N 19/137* (2014.11); *H04N 19/147* (2014.11); *H04N 19/176* (2014.11); *H04N 19/52* (2014.11); *H04N 19/61* (2014.11)

(56) References Cited

U.S. PATENT DOCUMENTS

2005/0123056 A1\* 6/2005 Wang .................. H04N 19/573
375/240.25

2007/0014359 A1\* 1/2007 Gomila .................. H04N 19/51
375/240.16

OTHER PUBLICATIONS

Laroche, Guillaume, Joel Jung, and Beatrice Pesquet-Popescu. "RD optimized coding for motion vector predictor selection." Circuits and Systems for Video Technology, IEEE Transactions on 18.9 (2008): 1247-1257.\*
International Search Report issued May 1, 2012 in International (PCT) Application No. PCT/JP2012/000491.
"Advanced video coding for generic audiovisual services", ITU-T Recommendation H. 264, Mar. 2010.
Test Model under Consideration Output Document (draft007), Joint Collaborative Team on Video Coding (JCT-VC) of ITU-T SGI6 WP3 and ITU-T SG16 WP3 and ISO/IEC JTC1/SC29/WG11 2nd Meeting: Geneva, CH, Document: JCTVC-B205, ITU-T, 2010.10, p. 78-93.

\* cited by examiner

| Merge block index | Merge block candidate |
|---|---|
| 0 | Adjacent block A |
| 1 | Adjacent block B |
| 2 | Adjacent block C |
| 3 | Co-located merge block |

| Merge block index | Assigned bit string |
|---|---|
| 0 | 0 |
| 1 | 10 |
| 2 | 110 |
| 3 | 111 |

FIG. 21

| Video stream (PID=0x1011, Primary video) |
|---|
| Audio stream (PID=0x1100) |
| Audio stream (PID=0x1101) |
| Presentation graphics stream (PID=0x1200) |
| Presentation graphics stream (PID=0x1201) |
| Interactive graphics stream (PID=0x1400) |
| Video stream (PID=0x1B00, Secondary video) |
| Video stream (PID=0x1B01, Secondary video) |

FIG. 32
| Corresponding standard | Driving frequency |
|---|---|
| MPEG-4 AVC | 500 MHz |
| MPEG-2 | 350 MHz |
| ⋮ | ⋮ |
FIG. 33A
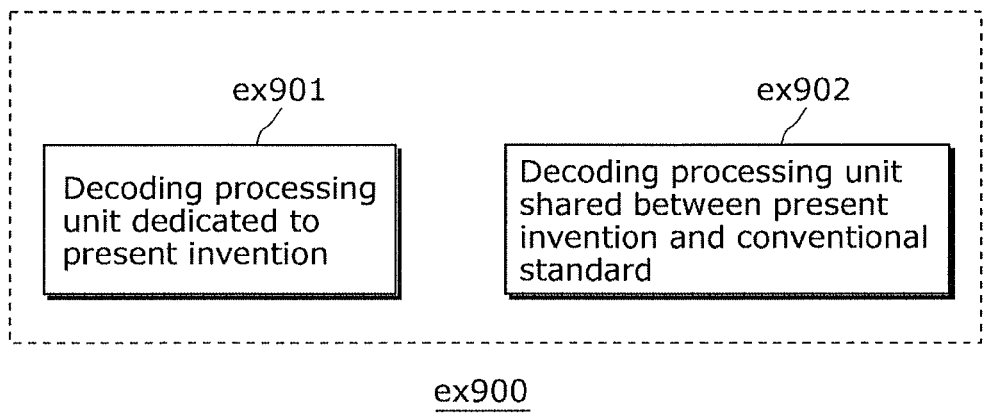
FIG. 33B
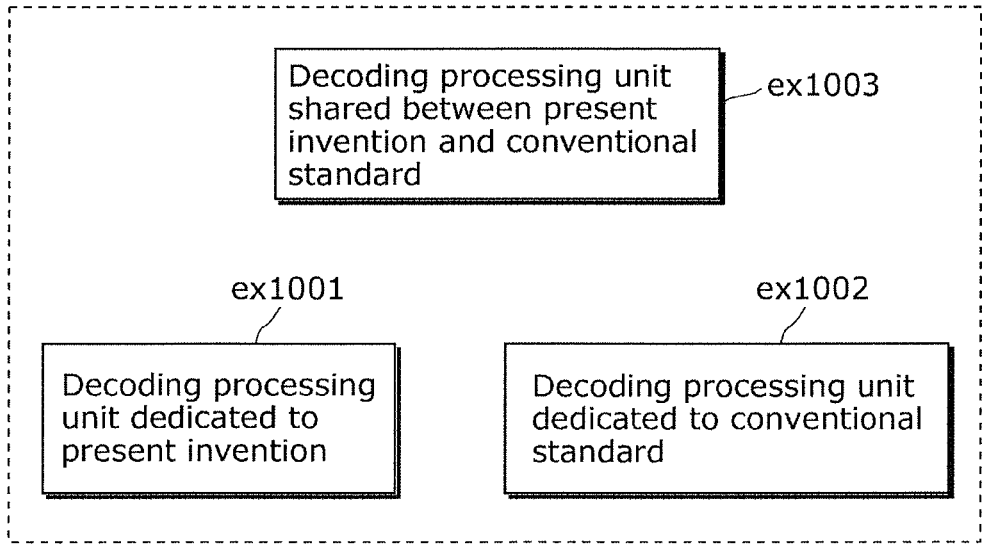

FIG. 35
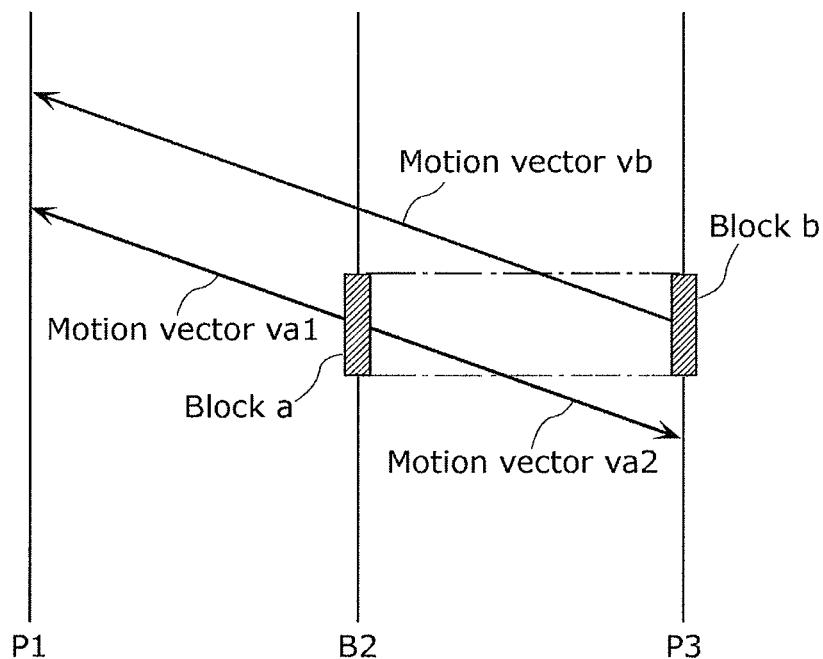
FIG. 36A
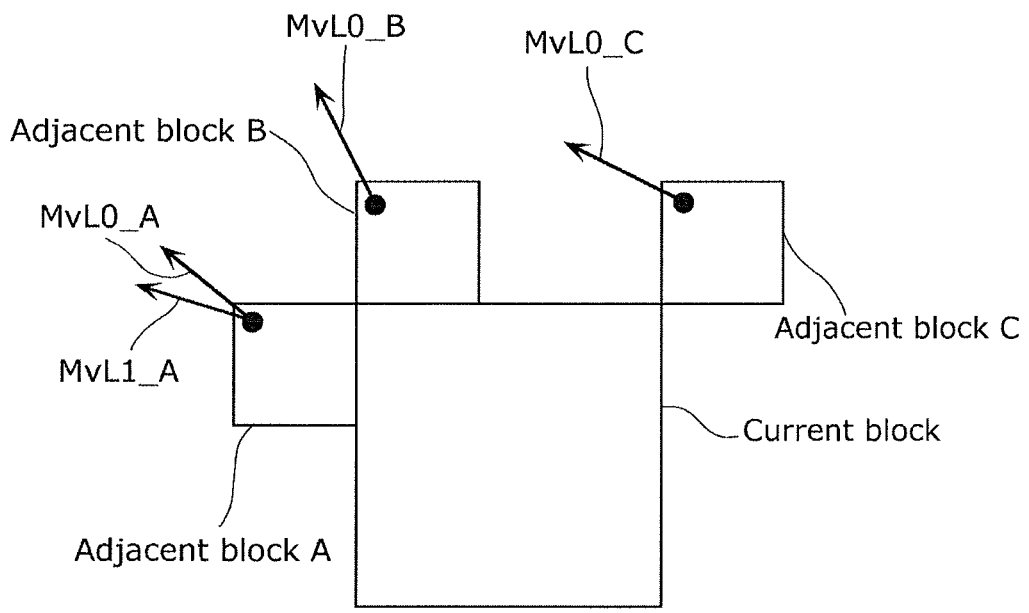
FIG. 36B
| Merge block index | Merge block candidate |
|---|---|
| 0 | Adjacent block A |
| 1 | Adjacent block B |
| 2 | Adjacent block C |

IMAGE CODING METHOD AND IMAGE DECODING METHOD

TECHNICAL FIELD

The present invention relates to an image coding method and an image decoding method that use a reference index and a motion vector.

BACKGROUND ART

An image coding apparatus typically compresses information by utilizing spatial and temporal redundancies of an image (including a still image and a moving image). Frequency domain transform is used as a method that utilizes the spatial redundancy. Inter prediction is used as a method that utilizes the temporal redundancy. Inter prediction is also referred to as inter-picture prediction.

When coding a current picture, an image coding apparatus that employs inter prediction uses a coded picture preceding or following the current picture in display order (display time order), as a reference picture. The image coding apparatus applies motion estimation to the current picture with respect to the reference picture, to derive a motion vector.

The image coding apparatus then performs motion compensation based on the motion vector, to obtain prediction image data. The image coding apparatus calculates a difference between the prediction image data and the image data of the current picture, and codes the calculated difference. The image coding apparatus thus removes the temporal redundancy.

In the motion estimation, the image coding apparatus calculates a difference between a current block to be coded in the current picture and each block in the reference picture, and determines, as a reference block, a block having a smallest difference in the reference picture. The image coding apparatus estimates the motion vector using the current block and the reference block.

An image coding apparatus according to the standardized image coding scheme called H.264 (see Non Patent Literature (NPL) 1) uses three picture types, namely, I picture, P picture, and B picture, for compressing information. The image coding apparatus does not perform inter prediction on the I picture, but performs intra prediction on the I picture. Intra prediction is also referred to as intra-picture prediction.

The image coding apparatus performs inter prediction on the P picture, by referencing to one coded picture preceding or following the current picture in display order. The image coding apparatus performs inter prediction on the B picture, by referencing to two coded pictures preceding or following the current picture in display order.

In inter prediction, the image coding apparatus generates a reference list (also referred to as a reference picture list) for specifying a reference picture. A coded reference picture which is referenced to in inter prediction is assigned a reference picture index (also referred to as a reference index) in the reference list. For example, the image coding apparatus holds two reference lists (L0, L1) to reference to two pictures for the B picture.

FIG. 34 shows an example of such reference lists. Reference picture list L0 in FIG. 34 is an example of a reference picture list corresponding to a first prediction direction in bidirectional prediction. In reference picture list L0 in FIG. 34, reference picture r1 whose display order number is 2 is assigned a reference picture index of 0. Reference picture r2 whose display order number is 1 is assigned a reference picture index of 1. Reference picture r3 whose display order number is 0 is assigned a reference picture index of 2.

That is, in reference picture list L0 in FIG. 34, a reference picture closer to the current picture in display order is assigned a smaller reference picture index.

Reference picture list L1 in FIG. 34 is an example of a reference picture list corresponding to a second prediction direction in bidirectional prediction. In reference picture list L1 in FIG. 34, reference picture r2 whose display order number is 1 is assigned a reference picture index of 0. Reference picture r1 whose display order number is 2 is assigned a reference picture index of 1. Reference picture r3 whose display order number is 0 is assigned a reference picture index of 2.

Thus, two different reference picture indexes may be assigned to a specific reference picture included in two reference picture lists (e.g. reference pictures r1 and r2 in FIG. 34), and the same reference picture index may be assigned to a specific reference picture included in two reference picture lists (e.g. reference picture r3 in FIG. 34).

Prediction using only reference picture list L0 is called L0 prediction. Prediction using only reference picture list L1 is called L1 prediction. Prediction using both reference picture lists L0 and L1 is called bidirectional prediction or bi-prediction.

In L0 prediction, the preceding direction is often used as the prediction direction. In L1 prediction, the following direction is often used as the prediction direction. Reference picture list L0 is set to correspond to the first prediction direction, whereas reference picture list L1 is set to correspond to the second prediction direction.

Based on these relations, the prediction direction is classified as any of the first prediction direction, the second prediction direction, and the bidirection. Prediction in the case where the prediction direction is the bidirection is also referred to as bidirectional prediction or bi-prediction.

In the image coding scheme called H.264, a motion estimation mode is available as a coding mode (also referred to as an inter prediction mode or a prediction mode) for the current block in the B picture.

In the motion estimation mode, the image coding apparatus estimates the motion vector of the current block. The image coding apparatus generates the prediction image data using the reference picture and the motion vector. The image coding apparatus then codes the difference between the prediction image data and the image data of the current block and the motion vector used for the generation of the prediction image data.

As mentioned above, the motion estimation mode includes bidirectional prediction for generating the prediction image by referencing to two coded pictures preceding or following the current picture. The motion estimation mode also includes unidirectional prediction for generating the prediction image by referencing to one coded picture preceding or following the current picture. Bidirectional prediction or unidirectional prediction is selected for the current block.

The image coding apparatus according to the image coding scheme called H.264 is also capable of selecting a coding mode referred to as a temporal direct mode, when deriving the motion vector in the coding of the B picture. The method of inter prediction in the temporal direct mode is described below, with reference to FIG. 35.

FIG. 35 is a diagram showing the motion vector in the temporal direct mode. FIG. 35 shows an example where the image coding apparatus codes block a in picture B2 in the temporal direct mode. In this case, the image coding apparatus uses motion vector vb that has been used when coding block b, which is at the same position as block a, in picture P3 which is a reference picture following picture B2. Motion vector vb references to picture P1.

Upon coding block a, the image coding apparatus obtains a reference block from each of picture P1 which is a preceding (forward) reference picture and picture P3 which is a following (backward) reference picture, using a motion vector parallel to motion vector vb. The image coding apparatus then performs bidirectional prediction to code block a. That is, the image coding apparatus codes block a by using motion vector va1 to picture P1 and motion vector vat to picture P3.

Moreover, a merge mode is available as a coding mode for the current block in the B picture and the P picture. In the merge mode, the image coding apparatus copies a motion vector and a reference picture index from an adjacent block of the current block, to code the current block. The image coding apparatus also adds, for example, an index of the adjacent block whose motion vector and reference picture index have been copied, to a bitstream. This enables the decoder to select the same motion vector and reference picture index as those used in the coder.

A specific example is described below, with reference to FIG. 36A. In FIG. 36A, adjacent block A is a coded block that is left adjacent to the current block. Adjacent block B is a coded block that is upper adjacent to the current block. Adjacent block C is a coded block that is upper right adjacent to the current block.

In FIG. 36A, adjacent block A is a block coded by bidirectional prediction, and has motion vector MvL0_A of the first prediction direction and motion vector MvL1_A of the second prediction direction. Adjacent block B is a block coded by unidirectional prediction, and has motion vector MvL0_B of the first prediction direction. Adjacent block C is a block coded by unidirectional prediction, and has motion vector MvL0_C of the first prediction direction.

In the example in FIG. 36A, motion vectors MvL0_A, MvL0_B, and MvL0_C reference to the same reference picture RefIdxL0, while motion vector MvL1_A references to reference picture RefIdxL1.

In this example, the image coding apparatus selects, from adjacent blocks A, B, and C, an adjacent block whose motion vector and reference picture index are to be copied to the current block. Here, the image coding apparatus selects such an adjacent block that maximizes the coding efficiency. The image coding apparatus then adds a merge block index indicating the selected adjacent block, to the bitstream.

For instance, in the case of selecting adjacent block A, the image coding apparatus codes the current block using motion vectors MvL0_A and MvL1_A and the reference pictures referenced to by motion vectors MvL0_A and MvL1_A. The image coding apparatus then adds only a merge block index indicating the use of adjacent block A, to the bitstream.

FIG. 36B shows an example of the merge block index. The image coding apparatus adds only such a merge block index to the bitstream, thus reducing the amount of information for motion vectors and reference picture indexes.

CITATION LIST

Non Patent Literature

[NPL 1]
ITU-T Recommendation H.264 "Advanced video coding for generic audiovisual services", March 2010

SUMMARY OF INVENTION

Technical Problem

In the conventional merge mode, however, the block as the merge source is limited to an adjacent block in the current picture. Therefore, the coding efficiency decreases in the case where the adjacent block has no motion vector such as when the adjacent block is intra coded.

In view of this, the present invention has an object of providing an image coding method that exhibits improved coding efficiency by subjecting not only an adjacent block in the current picture but also coding result information of a reference picture different from the current picture to the merge.

Solution to Problem

To solve the problems stated above, an image coding method according to the present invention is an image coding method of coding a current block to be coded using a first reference index and a first motion vector, the first reference index indicating a first reference picture, the image coding method including: calculating, using a second reference index and a second motion vector, a third reference index and a third motion vector as respective candidates for the first reference index and the first motion vector, the second reference index and the second motion vector being used to code a corresponding block that is included in a corresponding picture different from a current picture to be coded and whose position in the corresponding picture matches a position of the current block in the current picture; determining a value of a flag that indicates whether or not to code the current block using the third reference index and the third motion vector as the first reference index and the first motion vector; and coding the current block using the first reference index and the first motion vector according to the value of the flag, and adding the value of the flag to a bitstream generated by the coding.

Moreover, the calculating may include: copying the second reference index to the third reference index; and calculating the third motion vector by scaling the second motion vector using a display order number of the current picture, a display order number of the corresponding picture, a display order number of a second reference picture indicated by the second reference index, and a display order number of a third reference picture indicated by the third reference index.

Moreover, the calculating may include: determining whether or not a second reference picture indicated by the second reference index is included in a reference picture list of the current picture; copying, to the third reference index, a fourth reference index indicating the second reference picture in the reference picture list, in the case where the second reference picture is included in the reference picture list; disabling the third reference index in the case where the second reference picture is not included in the reference picture list; and calculating the third motion vector by scaling the second motion vector using a display order number of the current picture, a display order number of the corresponding picture, a display order number of the second reference picture, and a display order number of a third reference picture indicated by the third reference index, in the case where the third reference index is not disabled.

Moreover, the calculating may include: determining whether or not a second reference picture indicated by the second reference index is included in a reference picture list of the current picture; copying, to the third reference index, a fourth reference index indicating the second reference picture in the reference picture list, in the case where the second reference picture is included in the reference picture list; setting the third reference index to a maximum value assignable in the reference picture list, in the case where the second reference picture is not included in the reference picture list; and calculating the third motion vector by scaling the second motion vector using a display order number of the current picture, a display order number of the corresponding picture, a display order number of the second reference picture, and a display order number of a third reference picture indicated by the third reference index.

An image decoding method according to the present invention is an image decoding method of decoding a current block to be decoded using a first reference index and a first motion vector, the first reference index indicating a first reference picture, the image decoding method including: calculating, using a second reference index and a second motion vector, a third reference index and a third motion vector as respective candidates for the first reference index and the first motion vector, the second reference index and the second motion vector being used to decode a corresponding block that is included in a corresponding picture different from a current picture to be decoded and whose position in the corresponding picture matches a position of the current block in the current picture; obtaining, from a bitstream, a value of a flag that indicates whether or not to decode the current block using the third reference index and the third motion vector as the first reference index and the first motion vector; and decoding the current block using the first reference index and the first motion vector according to the value of the flag.

Moreover, the calculating may include: copying the second reference index to the third reference index; and calculating the third motion vector by scaling the second motion vector using a display order number of the current picture, a display order number of the corresponding picture, a display order number of a second reference picture indicated by the second reference index, and a display order number of a third reference picture indicated by the third reference index.

Moreover, the calculating may include: determining whether or not a second reference picture indicated by the second reference index is included in a reference picture list of the current picture; copying, to the third reference index, a fourth reference index indicating the second reference picture in the reference picture list, in the case where the second reference picture is included in the reference picture list; disabling the third reference index in the case where the second reference picture is not included in the reference picture list; and calculating the third motion vector by scaling the second motion vector using a display order number of the current picture, a display order number of the corresponding picture, a display order number of the second reference picture, and a display order number of a third reference picture indicated by the third reference index, in the case where the third reference index is not disabled.

Moreover, the calculating may include: determining whether or not a second reference picture indicated by the second reference index is included in a reference picture list of the current picture; copying, to the third reference index, a fourth reference index indicating the second reference picture in the reference picture list, in the case where the second reference picture is included in the reference picture list; setting the third reference index to a maximum value assignable in the reference picture list, in the case where the second reference picture is not included in the reference picture list; and calculating the third motion vector by scaling the second motion vector using a display order number of the current picture, a display order number of the corresponding picture, a display order number of the second reference picture, and a display order number of a third reference picture indicated by the third reference index.

Advantageous Effects of Invention

According to the present invention, the coding efficiency can be improved by subjecting not only an adjacent block in the current picture but also coding result information of a reference picture different from the current picture to the merge.

BRIEF DESCRIPTION OF DRAWINGS

FIG. 21 shows a structure of multiplexed data.

FIG. 32 shows an example of a look-up table in which standards of video data are associated with the driving frequencies.

FIG. 33A shows an example of a configuration for sharing a module of a signal processing unit.

FIG. 33B shows another example of a configuration for sharing a module of a signal processing unit.

FIG. 35 is a diagram showing an example of a motion vector in a temporal direct mode.

FIG. 36A is a diagram showing an example of adjacent blocks.

FIG. 36B is a diagram showing an example of merge block indexes.

DESCRIPTION OF EMBODIMENTS

Embodiments of the present invention are described below, with reference to drawings. The embodiments described below each represent a preferred embodiment of the present invention. The numerical values, shapes, materials, structural elements, the arrangement and connection of the structural elements, steps, the processing order of the steps etc. shown in the embodiments described below are mere examples, and therefore do not limit the present invention. The present invention is limited only by the claims. Accordingly, among the structural elements in the embodiments described below, the structural elements not recited in any one of the independent claims representing the broadest concepts of the present invention are described as not being necessarily required for achieving the object of the present invention but constituting preferred embodiments.

Embodiment 1

Figure 1:
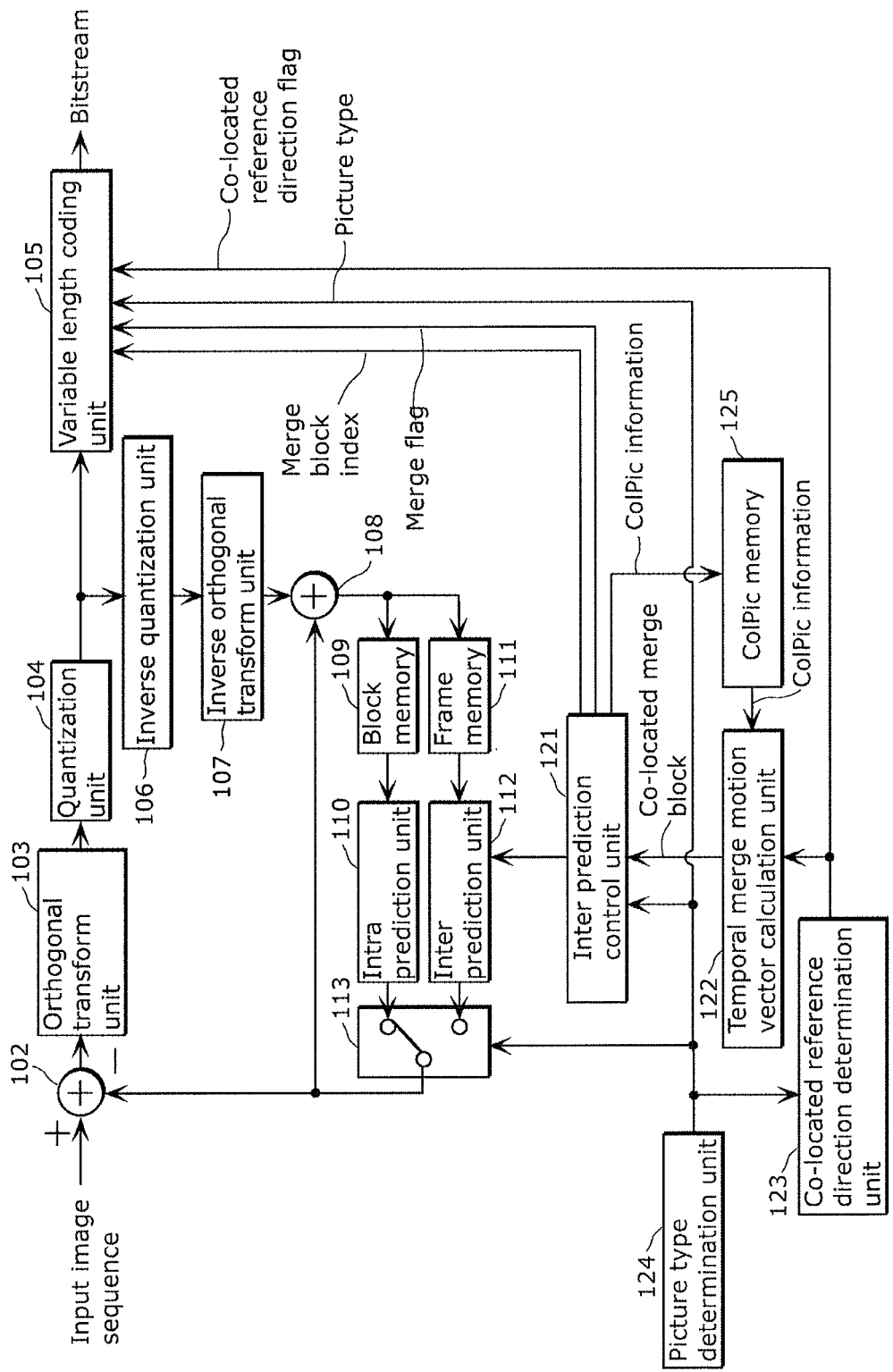
FIG. 1 is a block diagram showing a structure of an image coding apparatus according to Embodiment 1.

FIG. 1 is a block diagram showing an image coding apparatus according to this embodiment. As shown in FIG. 1, the image coding apparatus includes a subtraction unit 102, an orthogonal transform unit 103, a quantization unit 104, an inverse quantization unit 106, an inverse orthogonal transform unit 107, an addition unit 108, a block memory 109, a frame memory 111, an intra prediction unit 110, an inter prediction unit 112, a switch unit 113, an inter prediction control unit 121, a picture type determination unit 124, a temporal merge motion vector calculation unit 122, a colPic memory 125, a co-located reference direction determination unit 123, and a variable length coding unit 105.

The orthogonal transform unit 103 transforms an input image sequence from an image domain into a frequency domain. The quantization unit 104 quantizes the input image sequence transformed into the frequency domain. The inverse quantization unit 106 inverse quantizes the input image sequence quantized by the quantization unit 104. The inverse orthogonal transform unit 107 transforms the inverse quantized input image sequence from the frequency domain into the image domain.

The block memory 109 is a memory for storing the input image sequence on a block basis. The frame memory 111 is a memory for storing the input image sequence on a frame basis. The picture type determination unit 124 determines which picture type out of the I picture, the B picture, and the P picture is used to code the input image sequence, and generates picture type information.

The intra prediction unit 110 performs intra prediction on the current block using the input image sequence stored on a block basis in the block memory 109, to generate prediction image data. The inter prediction unit 112 performs inter prediction on the current block using the input image stored on a frame basis in the frame memory 111 and a motion vector derived by motion estimation, to generate prediction image data.

The co-located reference direction determination unit 123 determines whether a co-located block is a forward reference block or a backward reference block. The forward reference block is a block included in a picture that precedes the current picture in display order. The backward reference block is a block included in a picture that follows the current picture in display order.

The co-located reference direction determination unit 123 generates a co-located reference direction flag for each picture, and adds the co-located reference direction flag to the picture. The co-located block mentioned here is a block that is included in a picture different from the picture including the current block and whose position in the picture matches the position of the current block. The co-located block is a corresponding block that corresponds to the current block. The picture including the corresponding block is a corresponding picture that corresponds to the current picture.

Though the position of the co-located block is typically the same as the position of the current block as mentioned above, the position of the co-located block may be different from the position of the current block.

The temporal merge motion vector calculation unit 122 derives a merge block candidate (co-located merge block) in the merge mode, using colPic information stored in the colPic memory 125 and including a motion vector of the co-located block and the like. The temporal merge motion vector calculation unit 122 assigns a corresponding merge block index to the co-located merge block.

The temporal merge motion vector calculation unit 122 then sends the co-located merge block and the merge block index to the inter prediction control unit 121. In the case where the co-located block does not have a motion vector, the temporal merge motion vector calculation unit 122 stops the derivation of the co-located merge block, or derives the co-located merge block on an assumption that the motion vector is 0.

The inter prediction control unit 121 performs inter prediction using a prediction mode having a smallest prediction error, based on the prediction image generated using the motion vector derived by the motion estimation and the prediction image generated using the motion vector derived by the merge mode. The inter prediction control unit 121 sends a merge flag indicating whether or not the prediction mode is the merge mode, to the variable length coding unit 105.

In the case of selecting the merge mode as the prediction mode, the inter prediction control unit 121 sends the merge block index corresponding to the determined merge block and the prediction error information to the variable length coding unit 105. The inter prediction control unit 121 also transfers colPic information including the motion vector of the current block and the like, to the colPic memory 125.

The orthogonal transform unit 103 transforms prediction error data between the generated prediction image data and the input image sequence, from the image domain into the frequency domain. The quantization unit 104 quantizes the prediction error data transformed into the frequency domain. The variable length coding unit 105 performs variable length coding on the quantized prediction error data, the merge flag, the merge block index, the picture type information, and the co-located reference direction flag. The variable length coding unit 105 thus generates a bitstream.

Figure 2:
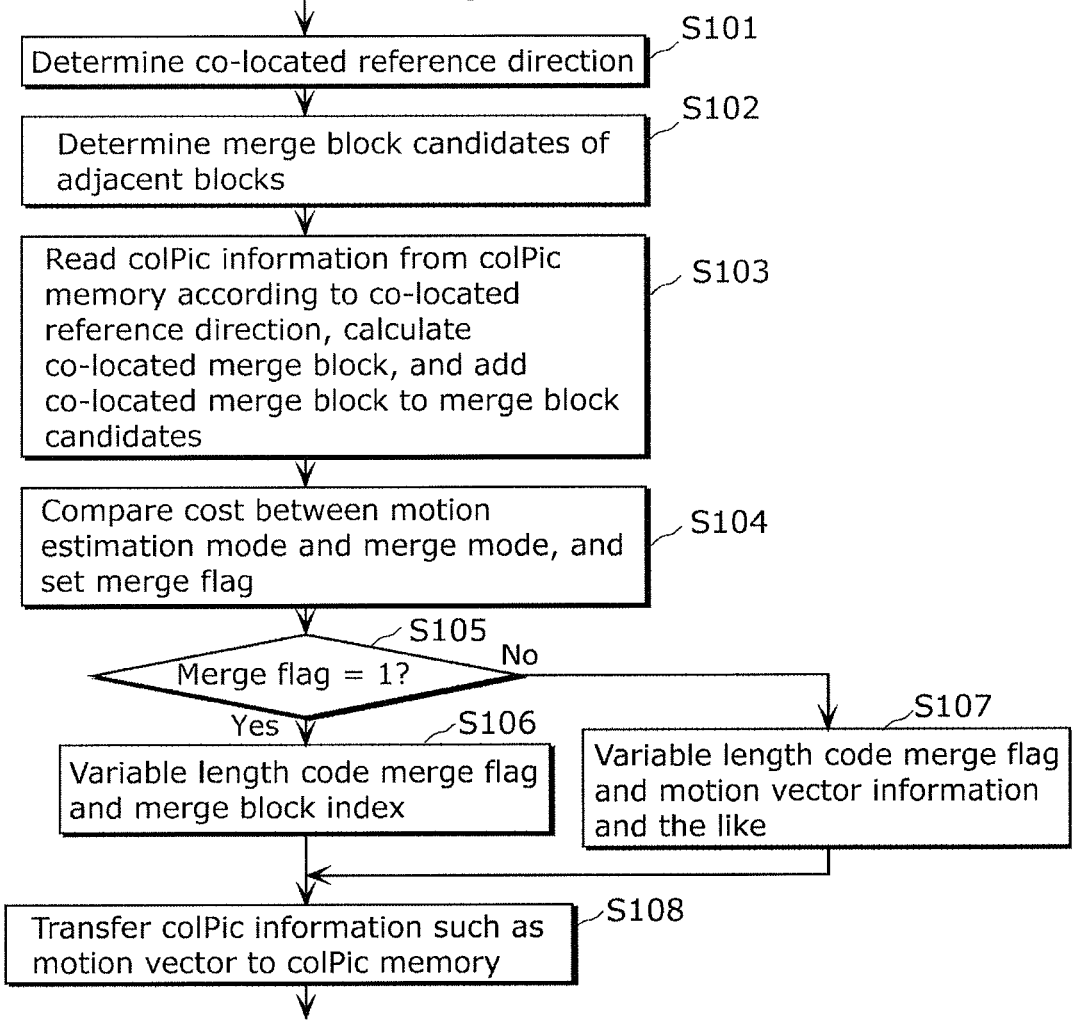
FIG. 2 is a flowchart showing an operation of the image coding apparatus according to Embodiment 1.

FIG. 2 shows an overall procedure of the image coding method according to this embodiment. The co-located reference direction determination unit 123 determines whether the co-located block is the forward reference block or the backward reference block, in the co-located merge block candidate derivation (Step S101).

For example, the co-located reference direction determination unit 123 determines, as the co-located block, a block belonging to a picture that is closer to the current picture in display order from among a forward reference picture to which the forward reference block belongs and a backward reference picture to which the backward reference block belongs. The co-located reference direction determination unit 123 generates, for each picture, the co-located block reference flag indicating whether the co-located block is the forward reference block or the backward reference block, and adds it to the picture.

Figure 3A:
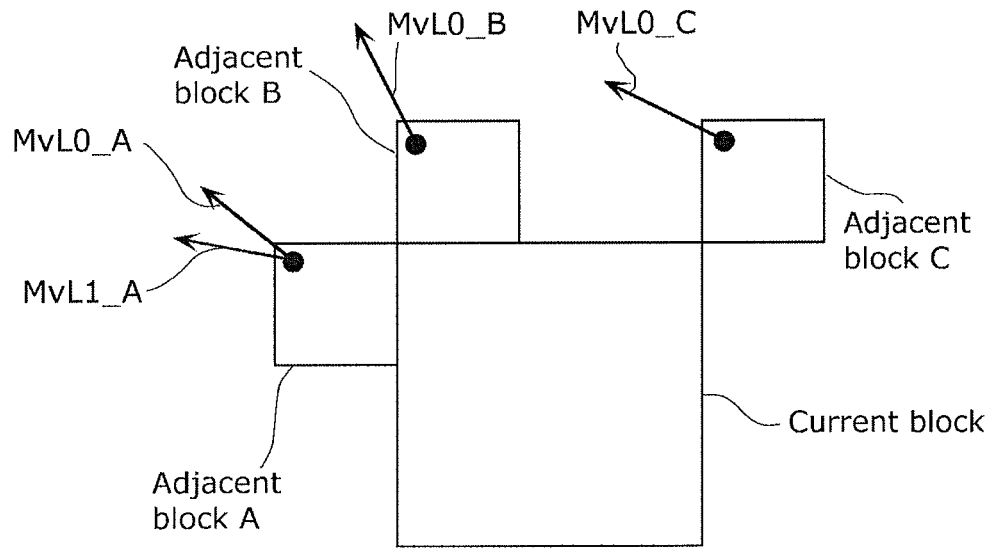
FIG. 3A is a diagram showing an example of merge block candidates according to Embodiment 1.
Figures 3B, 4, 5:
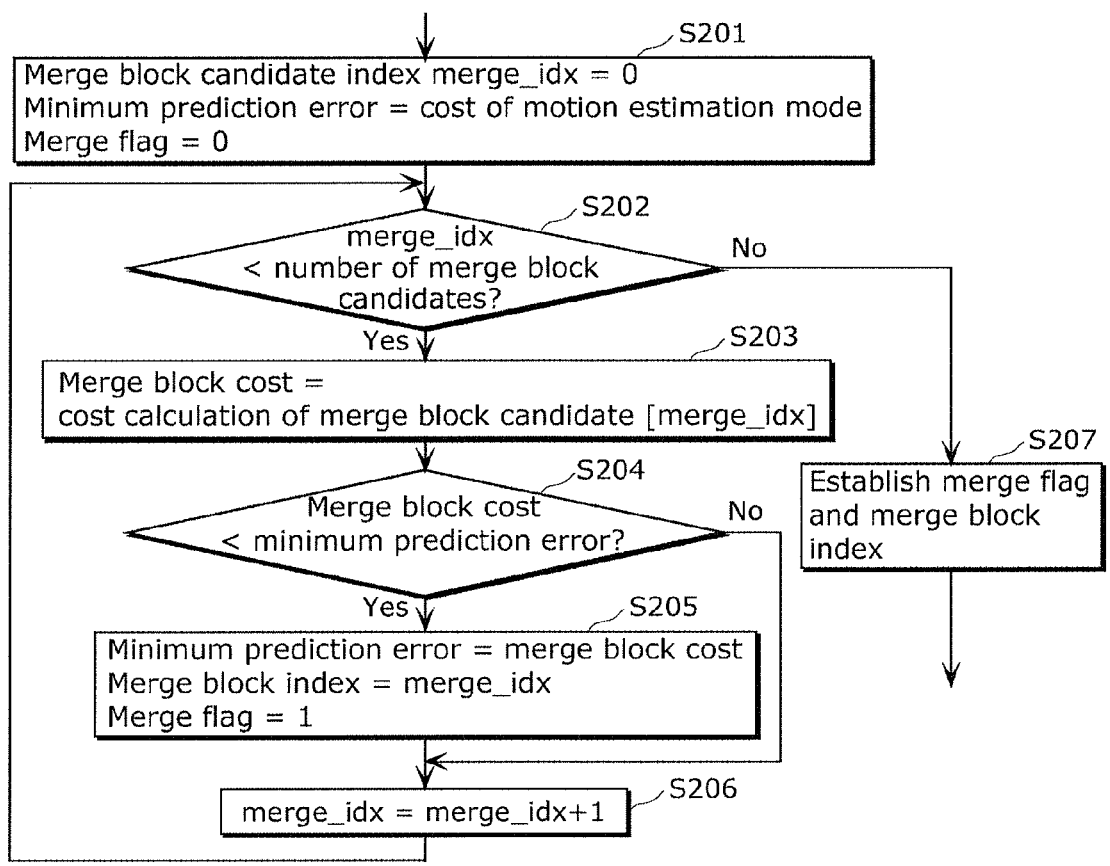
FIG. 3B is a diagram showing an example of merge block indexes according to Embodiment 1.
FIG. 4 is a diagram showing an example of a code table according to Embodiment 1.
FIG. 5 is a flowchart showing a comparison process according to Embodiment 1.

The inter prediction control unit 121 generates merge block candidates from adjacent blocks of the current block (Step S102). In FIG. 3A, for example, the inter prediction control unit 121 determines adjacent blocks A, B, and C as merge block candidates, for the motion vector and the reference picture index of the current block. The inter prediction control unit 121 then assigns a merge block index to each merge block candidate, as shown in FIG. 3B.

Typically, the amount of necessary information is smaller when the merge vector index is smaller, and the amount of necessary information is larger when the merge vector index is larger. Accordingly, the inter prediction control unit 121 assigns a smaller merge block index to a merge block that is more likely to have a motion vector and a reference picture index of high accuracy. This improves the coding efficiency.

For instance, the inter prediction control unit 121 may count, for each block, the number of times the block is selected as a merge block, and assign a smaller merge block index to a block having a larger number of times.

The temporal merge motion vector calculation unit 122 reads the colPic information including the motion vector of the co-located block and the like from the colPic memory 125, according to the co-located reference direction. The temporal merge motion vector calculation unit 122 derives the co-located merge block in the merge mode, using the reference picture index and the motion vector of the co-located block (Step S103).

The inter prediction control unit 121 assigns the corresponding merge block index to the co-located merge block, as shown in FIG. 3B.

The inter prediction control unit 121 compares the prediction error of the prediction image generated using the motion vector derived by the motion estimation and the prediction error of the prediction image generated based on the merge block candidate, according to the below-mentioned method. The inter prediction control unit 121 sets the merge flag to 1 when the prediction mode is the merge mode, and to 0 when the prediction mode is not the merge mode (Step S104).

The variable length coding unit 105 determines whether or not the merge flag is 1, i.e. whether or not the prediction mode is the merge mode (Step S105). When the merge flag is 1, the variable length coding unit 105 adds the merge flag and the merge block index used for the merge, to the bitstream (Step S106). When the merge flag is not 1, the variable length coding unit 105 adds the merge flag and the information in the motion estimation mode, to the bitstream (Step S107).

The inter prediction control unit 121 transfers the colPic information including the motion vector used for the inter prediction and the like to the colPic memory 125 to store it in the colPic memory 125, according to the below-mentioned method (Step S108). The colPic memory 125 stores the motion vector of the reference picture, the index value of the reference picture, the prediction direction, and the like, to calculate the motion vector of the current block in the temporal direct mode.

In this embodiment, the merge block index is assigned as shown in FIG. 3B. In detail, the value corresponding to adjacent block A is 0, the value corresponding to adjacent block B is 1, the value corresponding to adjacent block C is 2, and the value corresponding to the co-located merge block is 3. However, the merge block index assignment is not limited to this example.

FIG. 4 shows an example of a code table used when variable length coding the merge block index. A code with a shorter code length is assigned to a smaller merge block index. By assigning a smaller value to a merge block index corresponding to a merge block candidate that is more likely to have high prediction accuracy, improved coding efficiency can be attained.

FIG. 5 shows a detailed process of the cost comparison (Step S104) in FIG. 2. The inter prediction control unit 121 sets a merge block candidate index to 0, a minimum prediction error to the prediction error (cost) in the motion estimation mode, and the merge flag to 0 (Step S201). For example, the cost is calculated according to the following Expression 1 based on an R-D optimization model.

$$\text{Cost} = D + \lambda \times R \qquad \text{(Expression 1)}.$$

In Expression 1, D denotes a coding distortion. In detail, a sum of absolute differences between pixel values obtained by coding and decoding the current block using a prediction image generated by a motion vector and original pixel values of the current block is used as D, as an example. R denotes a generated code amount. In detail, the amount of code necessary for coding the motion vector used in the prediction image generation is used as R, as an example. $\lambda$ is Lagrange's undetermined multiplier.

The inter prediction control unit 121 determines whether or not the merge block candidate index is smaller than the number of merge block candidates of the current block, i.e. whether or not there is still a block that can be a merge candidate (Step S202). When the merge block candidate index is smaller than the number of merge block candidates, the inter prediction control unit 121 calculates the cost of the merge block candidate to which the merge block candidate index is assigned (Step S203).

The inter prediction control unit 121 determines whether or not the calculated cost of the merge block candidate is smaller than the minimum prediction error (Step S204). When the calculated cost of the merge block candidate is smaller than the minimum prediction error, the inter prediction control unit 121 updates the minimum prediction error, the merge block index, and the merge flag (Step S205). The inter prediction control unit 121 then adds 1 to the merge block candidate index, and repeats the above-mentioned process (Steps S202 to S206).

When there is no more merge block candidate (Step S202: No), the inter prediction control unit 121 establishes the eventual values of the merge flag and merge block index.

Figure 6:
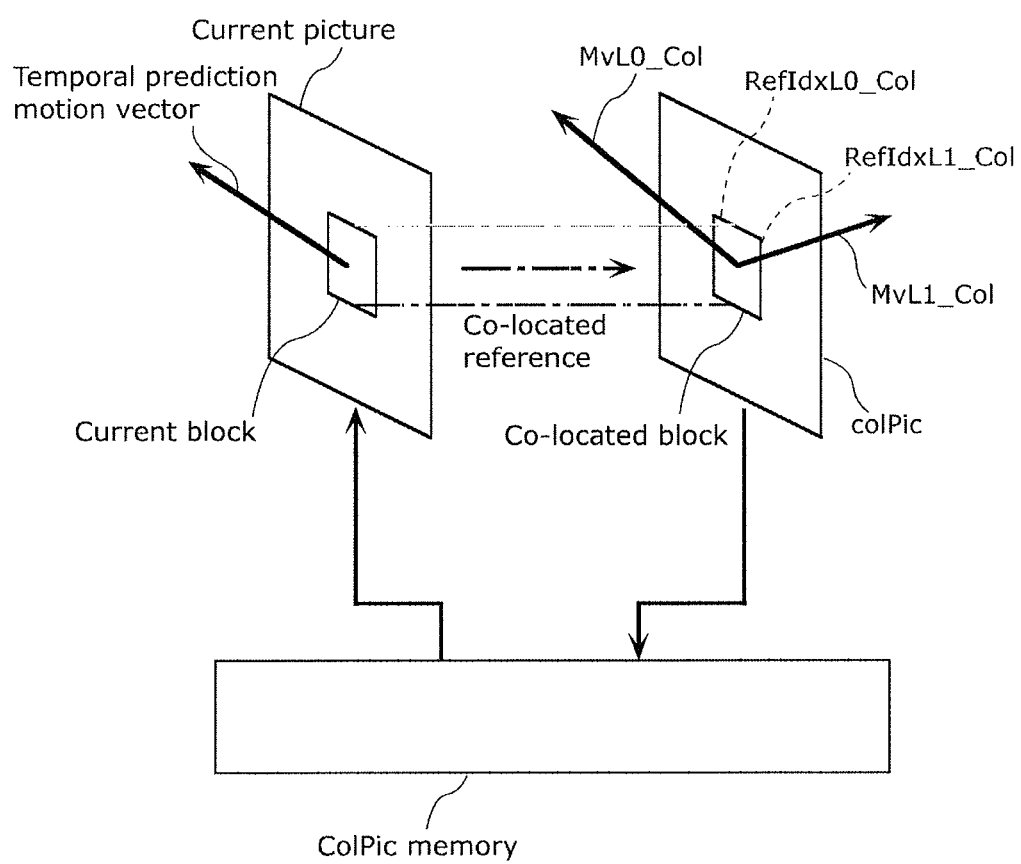
FIG. 6 is a schematic diagram showing a read/write process according to Embodiment 1.

FIG. 6 is a schematic diagram showing a read/write process on the colPic memory 125 shown in FIG. 1. FIG. 6 shows a co-located block included in a co-located picture colPic. FIG. 6 also shows motion vector MvL0_Col of the first prediction direction, reference picture index RefIdxL0_Col of the first prediction direction, motion vector MvL1_Col of the second prediction direction, and reference picture index RefIdxL1_Col of the second prediction direction, for the co-located block.

Though this embodiment uses an example where the first prediction direction is forward reference and the second prediction direction is backward reference, the first prediction direction and the second prediction direction may respectively be backward reference and forward reference, or the first prediction direction and the second prediction direction may both be forward reference or both be backward reference.

The co-located block is a block whose position in the co-located picture colPic matches the position of the current block in the current picture. Whether the co-located picture colPic follows or precedes the current picture is specified by the co-located reference direction flag.

Upon coding the current block, the colPic information stored in the colPic memory 125 and including the motion vector and the like is read according to the co-located reference flag, and the co-located merge block is calculated. The calculated co-located merge block is used to code the current block.

Figure 7:
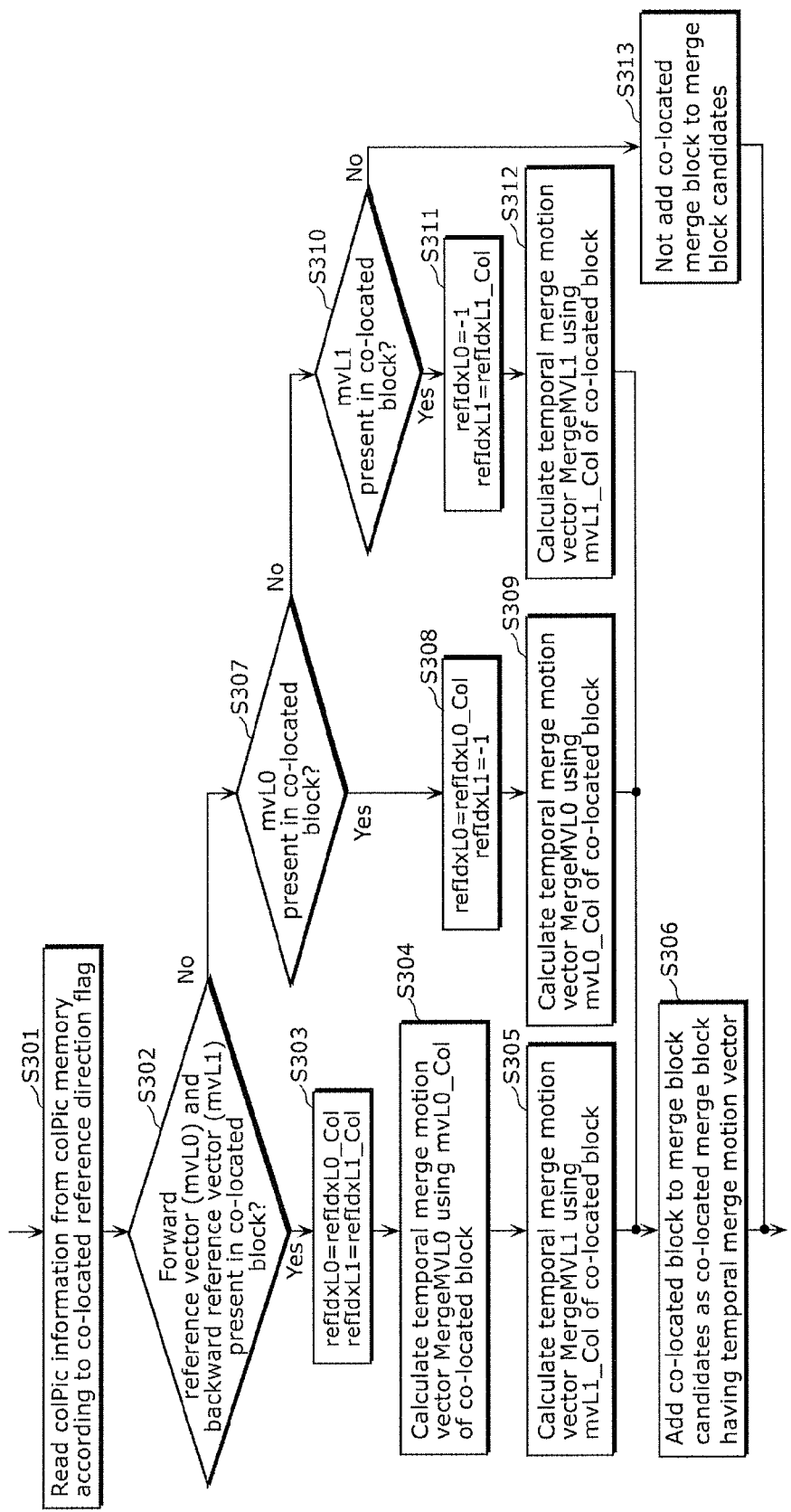
FIG. 7 is a flowchart showing a calculation process according to Embodiment 1.

FIG. 7 shows a detailed process of the merge block calculation (Step S103) in FIG. 2. The process shown in FIG. 7 is described below.

The temporal merge motion vector calculation unit 122 reads the colPic information from the colPic memory 125, according to the co-located reference direction flag (Step S301). The temporal merge motion vector calculation unit 122 determines whether or not the co-located block in the colPic information has two or more motion vectors. That is, the temporal merge motion vector calculation unit 122 determines whether or not the co-located block has a forward reference motion vector (mvL0) and a backward reference motion vector (mvL1) (Step S302).

When the co-located block has two or more motion vectors (Step S302: Yes), the temporal merge motion vector calculation unit 122 copies the value of reference picture index RefIdxL0_Col of the first prediction direction of the co-located block, to reference picture index RefIdxL0 of the first prediction direction of the current block. The temporal merge motion vector calculation unit 122 also copies the value of reference picture index RefIdxL1_Col of the second prediction direction of the co-located block, to reference picture index RefIdxL1 of the second prediction direction of the current block (Step S303).

The temporal merge motion vector calculation unit 122 calculates temporal merge motion vector MergeMvL0 of the first prediction direction, using motion vector mvL0_Col of the first prediction direction of the co-located block (Step S304). The temporal merge motion vector calculation unit 122 also calculates temporal merge motion vector MergeMvL1 of the second prediction direction, using motion vector mvL1_Col of the second prediction direction of the co-located block (Step S305).

When the co-located block does not have two or more motion vectors (Step S302: No), the temporal merge motion vector calculation unit 122 determines whether or not the co-located block has the forward reference motion vector (Step S307).

In the case of determining that the co-located block has the forward reference motion vector (Step S307: Yes), the temporal merge motion vector calculation unit 122 copies the value of reference picture index RefIdxL0_Col of the first prediction direction of the co-located block, to reference picture index RefIdxL0 of the first prediction direction of the current block.

The temporal merge motion vector calculation unit 122 also sets reference picture index RefIdxL1 of the second prediction direction of the current block to −1. Reference picture index RefIdxL1 equal to −1 indicates that the second prediction direction cannot be used. That is, the temporal merge motion vector calculation unit 122 determines the prediction direction as unidirectional (Step S308).

The temporal merge motion vector calculation unit 122 then calculates temporal merge motion vector MergeMvL0 of the first prediction direction, using motion vector mvL0_Col of the first prediction direction of the co-located block (Step S309).

In the case of determining that the co-located block does not have the forward reference motion vector (Step S307: No), the temporal merge motion vector calculation unit 122 determines whether or not the co-located block has the backward reference motion vector (Step S310).

In the case of determining that the co-located block has the backward reference motion vector (Step S310: Yes), the temporal merge motion vector calculation unit 122 sets reference picture index RefIdxL0 of the first prediction direction of the current block to −1. Reference picture index RefIdxL0 equal to −1 indicates that the first prediction direction cannot be used. That is, the temporal merge motion vector calculation unit 122 determines the prediction direction as unidirectional.

The temporal merge motion vector calculation unit 122 also copies the value of reference picture index RefIdx L1_Col of the second prediction direction of the co-located block, to reference picture index RefIdxL1 of the second prediction direction of the current block (Step S311).

The temporal merge motion vector calculation unit 122 then calculates temporal merge motion vector MergeMvL1 of the second prediction direction, using motion vector mvL1_Col of the second prediction direction of the co-located block (Step S312).

In the case of determining that the co-located block does not have the backward reference motion vector (Step S310: No), the temporal merge motion vector calculation unit 122 does not add the co-located merge block to the merge block candidates (Step S313).

In the case of calculating temporal merge motion vector MergeMVL0 or temporal merge motion vector MergeMVL1, the temporal merge motion vector calculation unit 122 adds the co-located merge block to the merge block candidates (Step S306).

The co-located merge block has temporal merge motion vector MergeMvL0 of the first prediction direction, for reference picture index RefIdxL0 of the first prediction direction. Moreover, the co-located merge block has temporal merge motion vector MergeMvL1 of the second prediction direction, for reference picture index RefIdxL1 of the second prediction direction.

In this embodiment, the reference picture index equal to −1 indicates that the direction cannot be used, i.e. the prediction direction is unidirectional. However, the present invention is not limited to this, and any form may be employed to indicate that the direction cannot be used.

In the process shown in FIG. 7, the temporal merge motion vector calculation unit 122 determines whether or not the co-located block has the forward reference motion vector, and then determines whether or not the co-located block has the backward reference motion vector.

However, the order of determination is not limited to the order in the process shown in FIG. 7. For instance, the temporal merge motion vector calculation unit 122 may determine whether or not the co-located block has the backward reference motion vector, and then determine whether or not the co-located block has the forward reference motion vector.

The method of deriving the temporal merge motion vector is described in detail below.

Figure 8A:
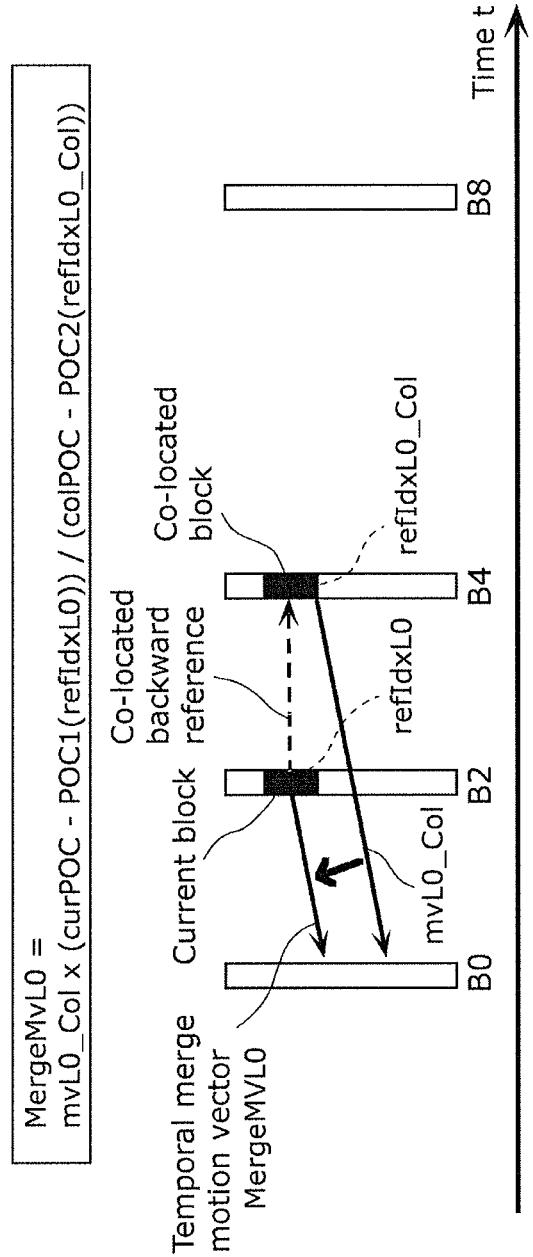
FIG. 8A is a diagram showing a first example of a temporal merge motion vector according to Embodiment 1.
Figure 8B:
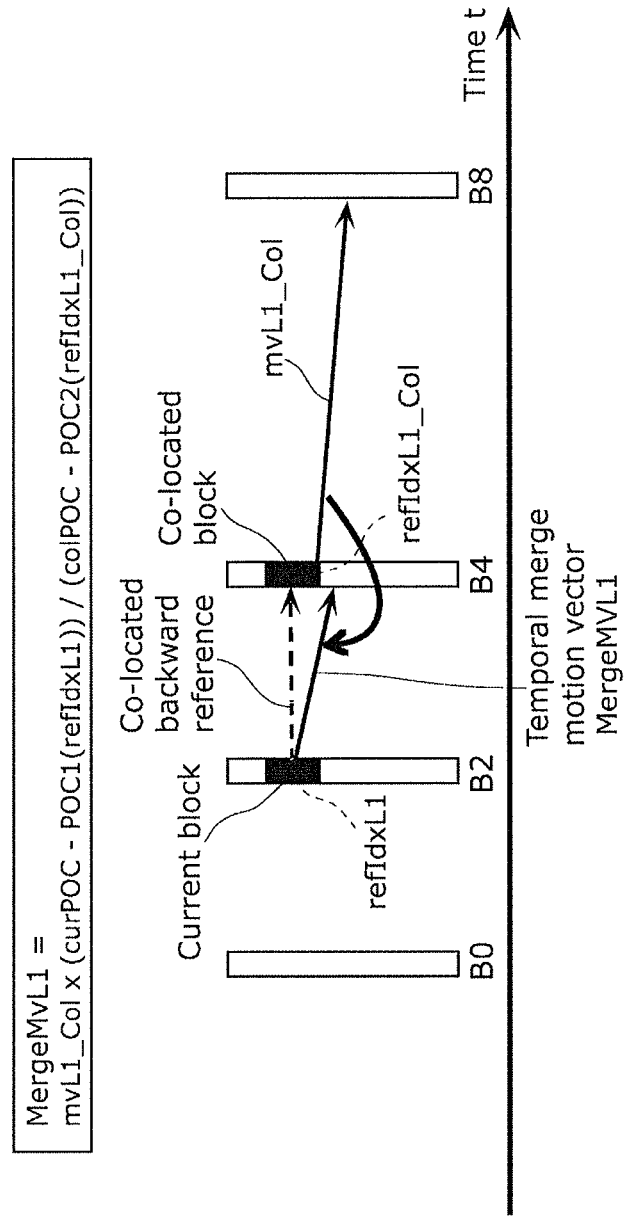
FIG. 8B is a diagram showing a second example of the temporal merge motion vector according to Embodiment 1.

FIGS. 8A and 8B show the method of deriving the temporal merge motion vector in the case where the co-located block is the backward reference block and has the forward reference motion vector and the backward reference motion vector. The temporal merge motion vector calculation unit 122 derives temporal merge motion vector MergeMvL0 of the current block according to the following Expression 2, using forward reference motion vector mvL0_Col of the co-located block.

$$\text{Merge}MvL0 = mvL0\_Col \times (curPOC - POC1(refIdx L0)) / (colPOC - POC2(refIdx L0\_Col)) \quad \text{(Expression 2)}.$$

Here, curPOC denotes the display order number of the current picture, and colPOC denotes the display order number of colPic. POC1(X) denotes the display order number of the reference picture indicated by reference picture index X in the reference picture list of the current picture. POC2(X) denotes the display order number of the reference picture indicated by reference picture index X in the reference picture list of colPic.

In FIG. 8A, (curPOC−POC1(refIdxL0)) denotes time difference information between picture B2 and picture B0 in display time, and (colPOC−POC2(refIdxL0_Col)) denotes time difference information between picture B4 and picture B0 in display time.

The temporal merge motion vector calculation unit 122 also derives temporal merge motion vector MergeMvL1 of the current block according to the following Expression 3, using backward reference motion vector mvL1_Col of the co-located block.

$$\text{Merge}MvL1 = mvL1\_Col \times (curPOC - POC1(refIdx L1)) / (colPOC - POC2(refIdx L1\_Col)) \quad \text{(Expression 3)}.$$

In FIG. 8B, (curPOC−POC1(refIdxL1)) denotes time difference information between picture B2 and picture B4 in display time, and (colPOC−POC2(refIdxL1_Col)) denotes time difference information between picture B4 and picture B8 in display time.

Figure 9A:
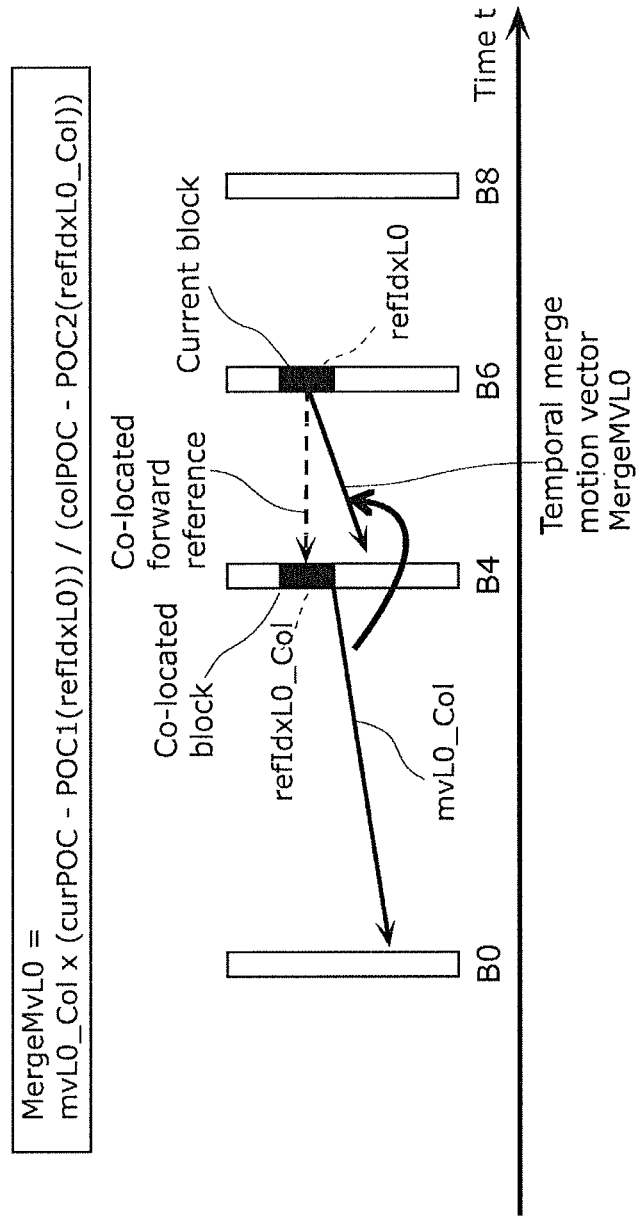
FIG. 9A is a diagram showing a third example of the temporal merge motion vector according to Embodiment 1.
Figure 9B:
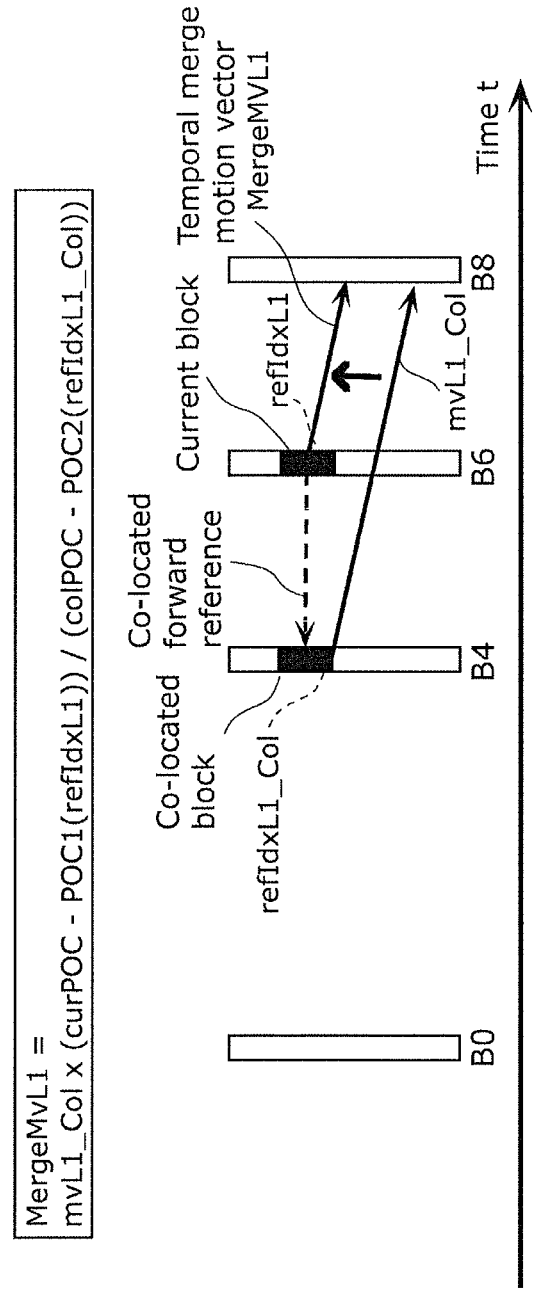
FIG. 9B is a diagram showing a fourth example of the temporal merge motion vector according to Embodiment 1.

FIGS. 9A and 9B show the method of deriving the temporal merge motion vector in the case where the co-located block is the forward reference block and has the forward reference motion vector and the backward reference motion vector. The temporal merge motion vector calculation unit 122 derives temporal merge motion vector MergeMvL0 of the current block according to the following Expression 4, using forward reference motion vector mvL0_Col of the co-located block.

$$\text{Merge}MvL0 = mvL0\_Col \times (curPOC - POC1(refIdx L0)) / (colPOC - POC2(refIdx L0\_Col)) \quad \text{(Expression 4)}.$$

In FIG. 9A, (curPOC−POC1(refIdxL0)) denotes time difference information between picture B6 and picture B4 in display time, and (colPOC−POC2(refIdxL0_Col)) denotes time difference information between picture B4 and picture B0 in display time.

The temporal merge motion vector calculation unit 122 also derives temporal merge motion vector MergeMvL1 of the current block according to the following Expression 5, using backward reference motion vector mvL1_Col of the co-located block.

$$\text{Merge}MvL1 = mvL1\_Col \times (curPOC - POC1(refIdx L1)) / (colPOC - POC2(refIdx L1\_Col)) \quad \text{(Expression 5)}.$$

In FIG. 9B, (curPOC−POC1(refIdxL1)) denotes time difference information between picture B6 and picture B8 in display time, and (colPOC—POC2(refIdxL1_Col)) denotes time difference information between picture B4 and picture B8 in display time.

Thus, according to this embodiment, the image coding apparatus uses not only an adjacent block in the current picture but also coding result information of a reference picture different from the current picture, as a merge block candidate. This improves the coding efficiency.

In more detail, the image coding apparatus uses the co-located block of the current block as a merge block candidate.

For example, the image coding apparatus copies the value of the reference picture index of the co-located block, to the reference picture index of the current block. The image coding apparatus also uses the motion vector of the co-located block, for the motion vector of the current block. The motion vector of the co-located block is appropriately scaled according to the positional relationship between the current picture, the reference picture, colPic, and the picture referenced to by colPic.

As a result, the image coding apparatus can generate optimal merge block candidates for the current block.

Embodiment 2

Embodiment 2 is different from Embodiment 1 in the method of determining RefIdx of the current block (Steps S303, S308, and S311 in FIG. 7). Embodiment 2 is otherwise the same as Embodiment 1, and so its description is omitted.

Figure 10:
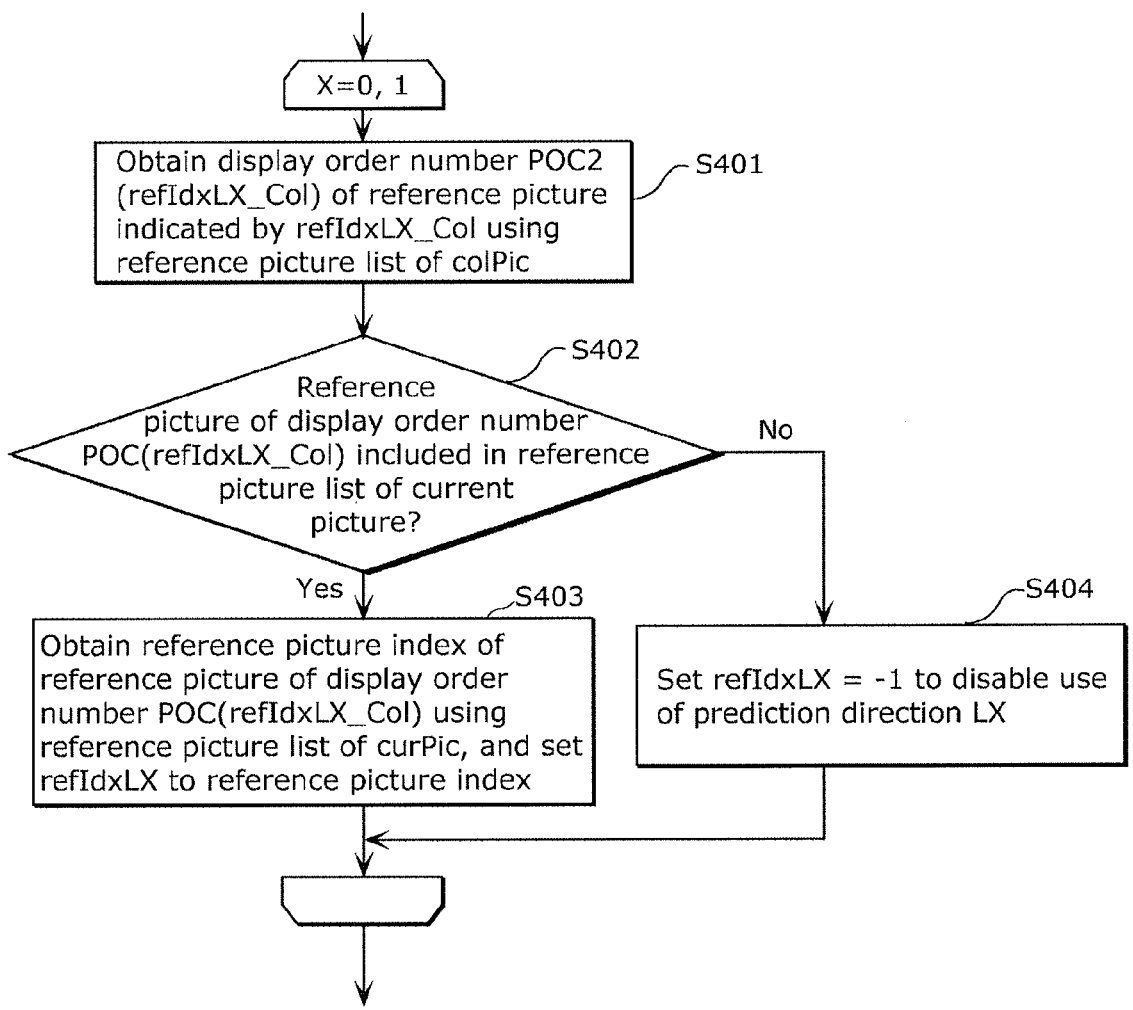
FIG. 10 is a flowchart showing a reference index calculation process according to Embodiment 2.

FIG. 10 shows a detailed process of the calculation of RefIdx of the current block in Embodiment 2. The process shown in FIG. 10 is described below. Note that the process (Steps S401 to S404) shown in FIG. 10 is performed for each of the first prediction direction (X=0) and the second prediction direction (X=1).

The temporal merge motion vector calculation unit 122 calculates display order number POC2(RefIdxLX_Col) of the reference picture indicated by RefIdxLX_Col of the co-located block, using the reference picture list of colPic (Step S401).

The temporal merge motion vector calculation unit 122 then determines whether or not the reference picture of display order number POC2(RefIdxLX_Col) is included in the reference picture list of the current picture (Step S402).

In the case where the reference picture is included (Step S402: Yes), the temporal merge motion vector calculation unit 122 calculates the reference picture index of the reference picture of display order number POC2(RefIdxLX_Col), using the reference picture list of the current picture. The temporal merge motion vector calculation unit 122 sets RefIdxLX of the current block to the calculated reference picture index (Step S403).

In the case where the reference picture is not included (Step S402: No), the temporal merge motion vector calculation unit 122 sets RefIdxLX of the current block to −1 (Step S404). RefIdxLX equal to −1 indicates that the prediction direction cannot be used, i.e. the prediction direction in the merge mode is unidirectional.

In this embodiment, the reference picture index equal to −1 indicates that the direction cannot be used, i.e. the prediction direction is unidirectional. However, the present invention is not limited to this, and any form may be employed to indicate that the direction cannot be used.

In this embodiment, in the case where the reference picture of display order number POC2(RefIdxLX_Col) is not included in the reference picture list of the current picture (Step S402: No), the temporal merge motion vector calculation unit 122 disables the use of the direction. However, the present invention is not limited to this. For example, the temporal merge motion vector calculation unit 122 may determine a maximum reference picture index usable in the reference picture list of the current picture, as the reference picture index of the current block.

The method of deriving the temporal merge motion vector according to this embodiment is described in detail below.

Figure 11A:
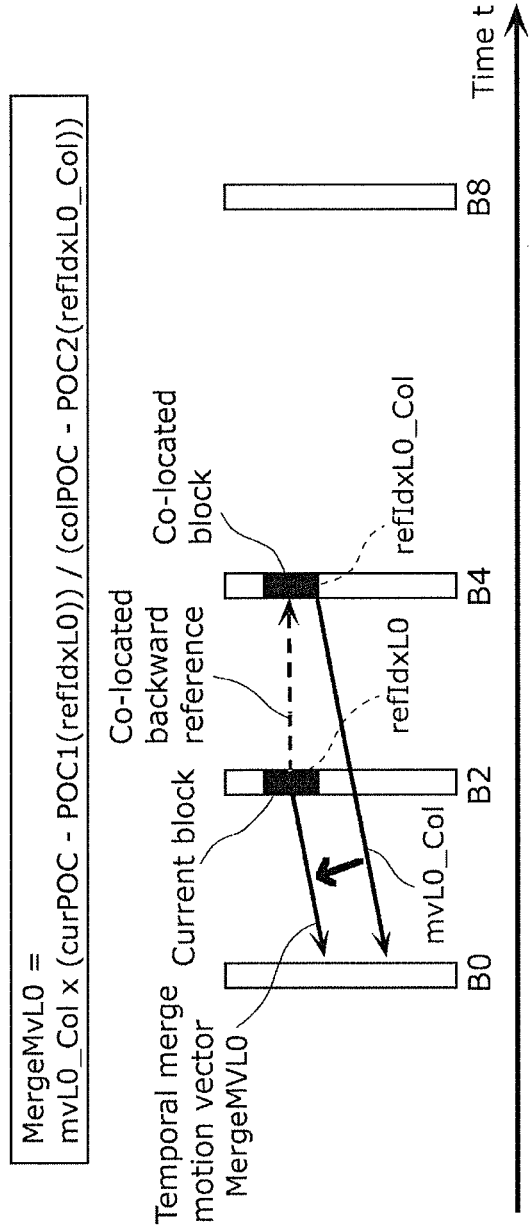
FIG. 11A is a diagram showing a first example of a temporal merge motion vector according to Embodiment 2.
Figure 11B:
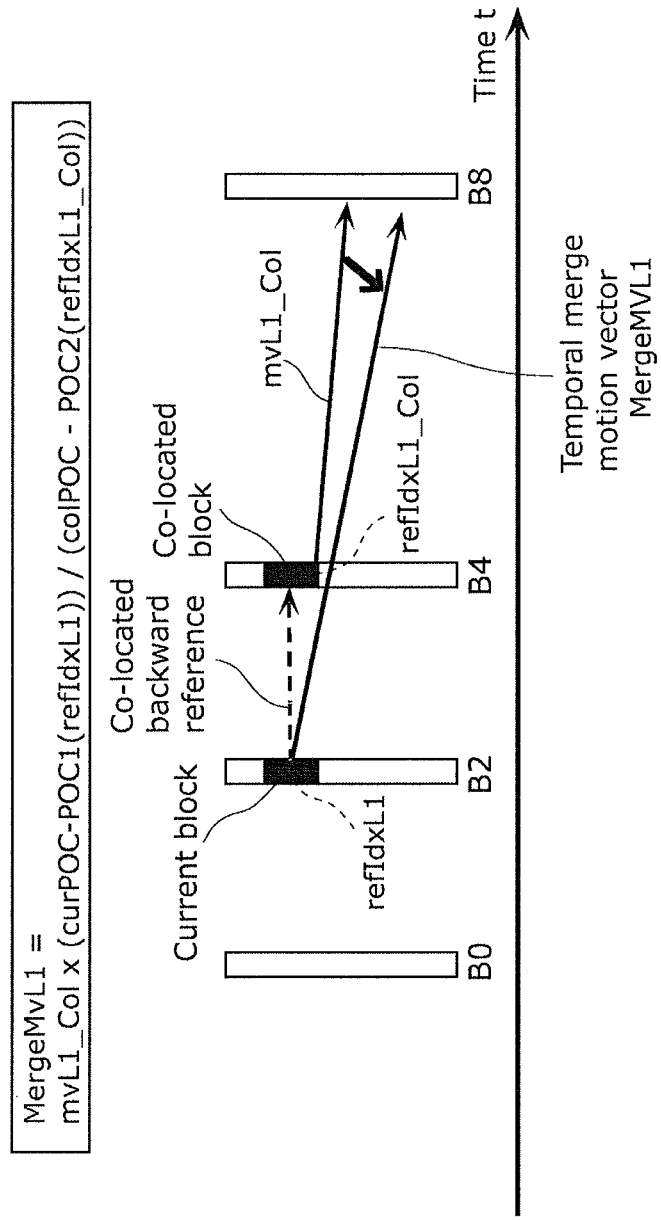
FIG. 11B is a diagram showing a second example of the temporal merge motion vector according to Embodiment 2.

FIGS. 11A and 11B show the method of deriving the temporal merge motion vector in the case where the co-located block is the backward reference block and has the forward reference motion vector and the backward reference motion vector. The temporal merge motion vector calculation unit 122 derives temporal merge motion vector MergeMvL0 of the current block according to the following Expression 6, using forward reference motion vector mvL0_Col of the co-located block.

$$\text{Merge}MvL0 = mvL0\_Col \times (curPOC - POC1(refIdxL0))/(colPOC - POC2(refIdxL0\_Col)) \quad \text{(Expression 6).}$$

Here, refIdxL0 denotes the reference picture index of the first prediction direction of the current block calculated in the process shown in FIG. 10. In FIG. 11A, (curPOC−POC1(refIdxL0)) denotes time difference information between picture B2 and picture B0 in display time, and (colPOC−POC2(refIdxL0_Col)) denotes time difference information between picture B4 and picture B0 in display time.

The temporal merge motion vector calculation unit 122 also derives temporal merge motion vector MergeMvL1 of the current block according to the following Expression 7, using backward reference motion vector mvL1_Col of the co-located block.

$$\text{Merge}MvL1 = myL1\_Col \times (curPOC - POC1(refIdxL1))/(colPOC - POC2(refIdxL1\_Col)) \quad \text{(Expression 7).}$$

Here, refIdxL1 denotes the reference picture index of the second prediction direction of the current block calculated in the process shown in FIG. 10. In FIG. 11B, (curPOC−POC1(refIdxL1)) denotes time difference information between picture B2 and picture B8 in display time, and (colPOC−POC2(refIdxL1_Col)) denotes time difference information between picture B4 and picture B8 in display time.

In the case where picture B8 is not included in the reference picture list of the current picture in FIG. 11B, the second prediction direction cannot be used (Step S404 in FIG. 10). In such a case, the temporal merge motion vector calculation unit 122 adds, for example, the unidirectional co-located merge block to the merge block candidates.

Figure 12A:
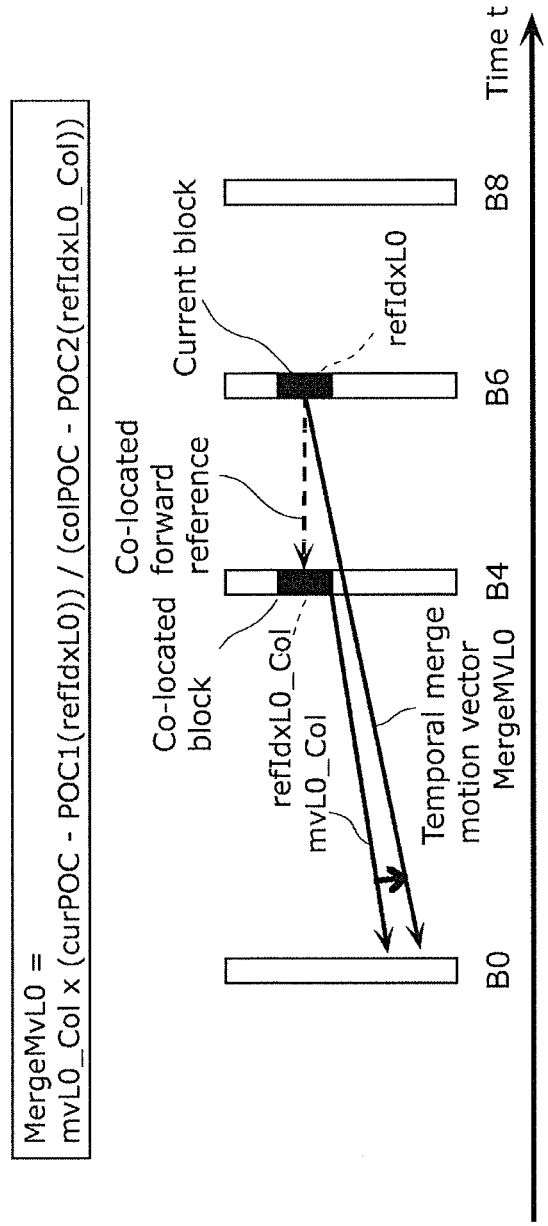
FIG. 12A is a diagram showing a third example of the temporal merge motion vector according to Embodiment 2.
Figure 12B:
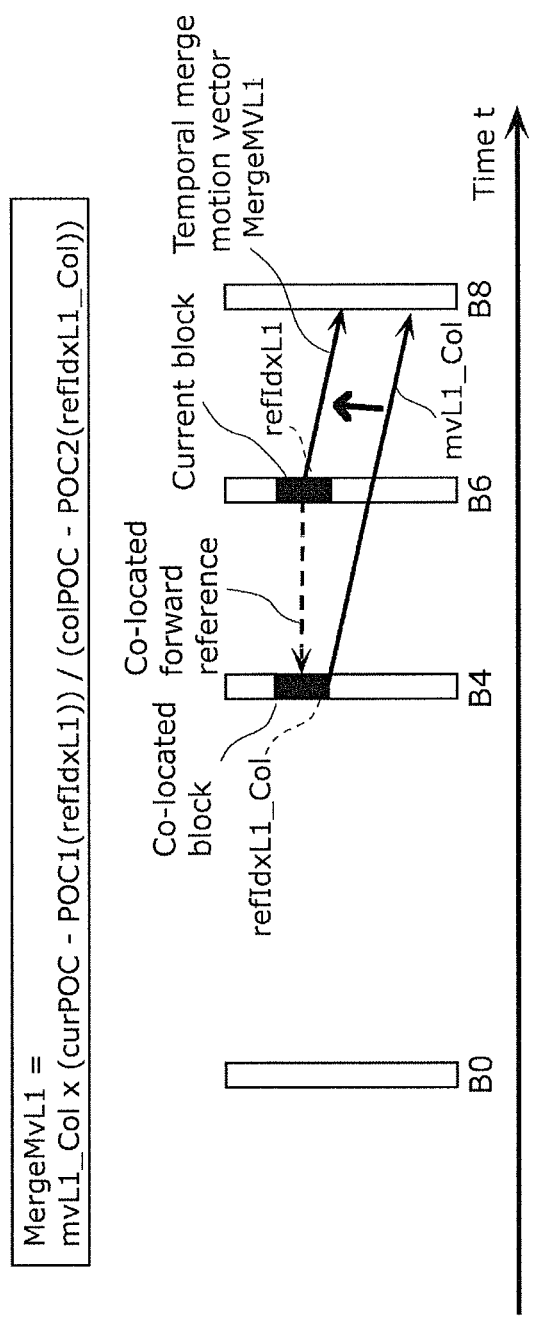
FIG. 12B is a diagram showing a fourth example of the temporal merge motion vector according to Embodiment 2.

FIGS. 12A and 12B show the method of deriving the temporal merge motion vector in the case where the co-located block is the forward reference block and has the forward reference motion vector and the backward reference motion vector. The temporal merge motion vector calculation unit 122 derives temporal merge motion vector MergeMvL0 of the current block according to the following Expression 8, using forward reference motion vector mvL0_Col of the co-located block.

$$\text{Merge}MvL0 = mvL0\_Col \times (curPOC - POC1(refIdxL0))/(colPOC - POC2(refIdxL0\_Col)) \quad \text{(Expression 8).}$$

Here, refIdxL0 denotes the reference picture index of the first prediction direction of the current block calculated in the process shown in FIG. 10. In FIG. 12A, (curPOC−POC1(refIdxL0)) denotes time difference information between picture B6 and picture B0 in display time, and (colPOC−POC2(refIdxL0_Col)) denotes time difference information between picture B4 and picture B0 in display time.

In the case where picture B0 is not included in the reference picture list of the current picture in FIG. 12A, the first prediction direction cannot be used (Step S404 in FIG. 10). In such a case, the temporal merge motion vector calculation unit 122 adds, for example, the unidirectional co-located merge block to the merge block candidates.

The temporal merge motion vector calculation unit 122 also derives temporal merge motion vector MergeMvL1 of the current block according to the following Expression 9, using backward reference motion vector mvL1_Col of the co-located block.

$$\text{Merge}MvL1 = mvL1\_Col \times (curPOC - POC1(refIdxL1))/(colPOC - POC2(refIdxL1\_Col)) \quad \text{(Expression 9).}$$

Here, refIdxL1 denotes the reference picture index of the second prediction direction of the current block calculated in the process shown in FIG. 10. In FIG. 12B, (curPOC−POC1(refIdxL1)) denotes time difference information between picture B6 and picture B8 in display time, and (colPOC−POC2(refIdxL1_Col)) denotes time difference information between picture B4 and picture B8 in display time.

Thus, according to this embodiment, the image coding apparatus uses not only an adjacent block in the current picture but also coding result information of a reference picture different from the current picture, as a merge block candidate. This improves the coding efficiency.

In more detail, the image coding apparatus uses the co-located block of the current block as a merge block candidate.

For example, the image coding apparatus converts the reference picture index in the reference picture list of the current picture, based on the reference picture indicated by the reference picture index of the co-located block. This enables the image coding apparatus to reference to the reference picture of the co-located block as the reference picture of the current block. The accuracy of the temporal merge motion vector of the co-located merge block is improved in this way, contributing to improved coding efficiency.

In the case where the reference picture indicated by the reference picture index of the co-located block is not included in the reference picture list of the current picture, the image coding apparatus does not use the corresponding prediction direction. The image coding apparatus can thus generate the co-located merge block that can be merged appropriately.

This embodiment may be combined with another embodiment. For example, the image coding apparatus may add the co-located merge block obtained in Embodiment 1 to the merge block candidates as a first co-located merge block, and add the co-located merge block obtained in Embodiment 2 to the merge block candidates as a second co-located merge block.

In this case, the image coding apparatus may select the prediction mode having a smallest prediction error in the process shown in FIG. 5. In the assignment of the merge block index to the co-located merge block in FIG. 3B, the image coding apparatus may assign 3 to the first co-located merge block, and 4 to the second co-located merge block. As a result, the image coding apparatus can more appropriately select the merge block for coding the current block.

Embodiment 3

Figure 13:
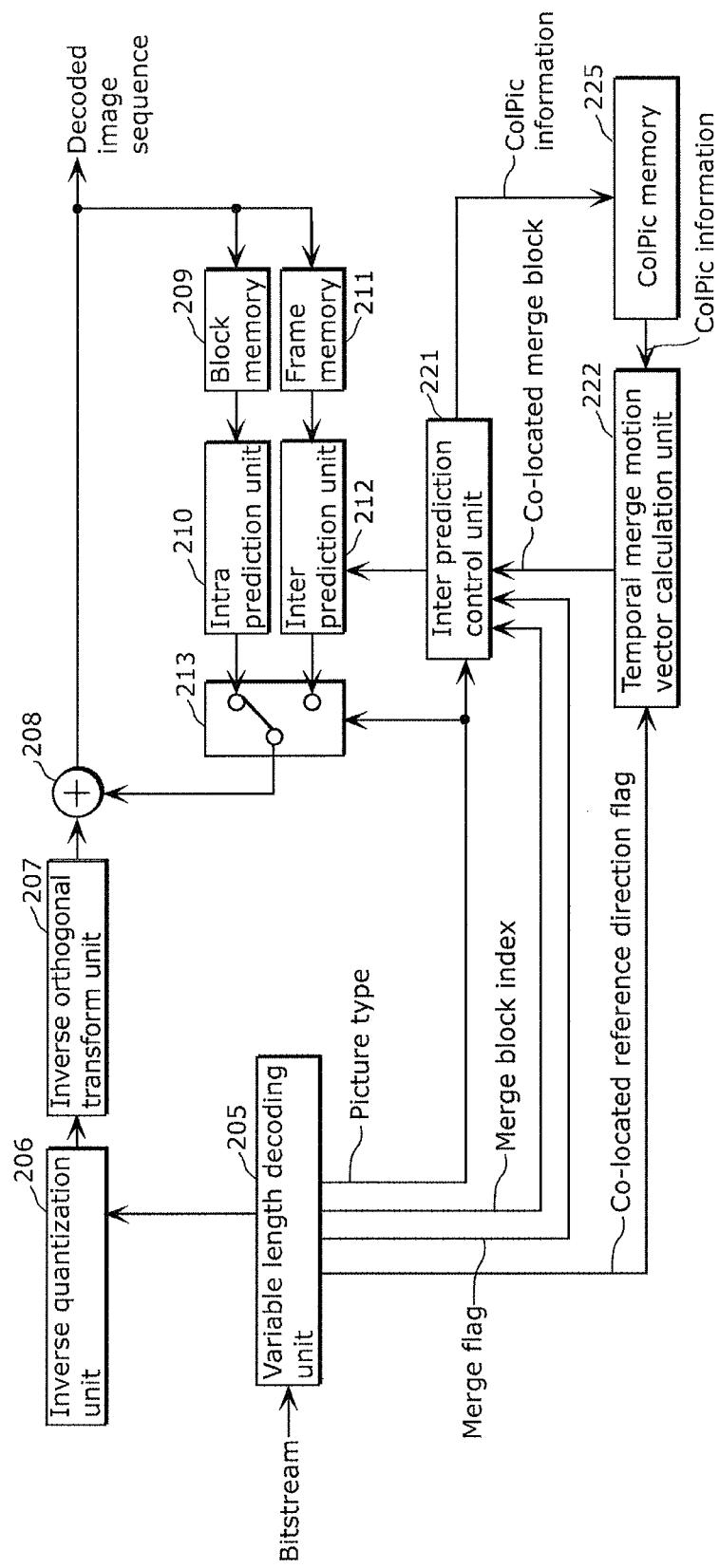
FIG. 13 is a block diagram showing a structure of an image decoding apparatus according to Embodiment 3.

FIG. 13 is a block diagram showing a structure of an image decoding apparatus according to this embodiment.

In this embodiment, a block included in a picture preceding, in display order, the current picture to be decoded is referred to as a forward reference block, and a block included in a picture following the current picture in display order is referred to as a backward reference block.

As shown in FIG. 13, the image decoding apparatus includes a variable length decoding unit 205, an inverse quantization unit 206, an inverse orthogonal transform unit 207, an addition unit 208, a block memory 209, a frame memory 211, an intra prediction unit 210, an inter prediction unit 212, a switch unit 213, an inter prediction control unit 221, a temporal merge motion vector calculation unit 222, and a colPic memory 225.

The variable length decoding unit 205 performs variable length decoding on an input bitstream. The variable length decoding unit 205 as a result generates picture type information, a merge flag, a merge block index, a co-located reference direction flag, and the variable length decoded bitstream. The inverse quantization unit 206 inverse quantizes the variable length decoded bitstream. The inverse orthogonal transform unit 207 transforms the inverse quantized bitstream from the frequency domain into the image domain, to generate prediction error image data.

The block memory 209 is a memory for storing an image sequence generated by adding the prediction error image data and prediction image data, on a block basis. The frame memory 211 is a memory for storing the image sequence on a frame basis.

The intra prediction unit 210 performs intra prediction using the image sequence stored on a block basis in the block memory 209, to generate the prediction error image data of the current block to be decoded. The inter prediction unit 212 performs inter prediction using the image sequence stored on a frame basis in the frame memory 211, to generate the prediction error image data of the current block.

The temporal merge motion vector calculation unit 222 derives a merge block candidate (co-located merge block) in the merge mode, using colPic information stored in the colPic memory 225 and including a motion vector of the co-located block and the like. The temporal merge motion vector calculation unit 222 assigns a corresponding merge block index to the co-located merge block.

The temporal merge motion vector calculation unit 222 then sends the co-located merge block and the merge block index to the inter prediction control unit 221. In the case where the co-located block does not have a motion vector, the temporal merge motion vector calculation unit 222 stops the derivation of the co-located merge block, or derives the co-located merge block on an assumption that the motion vector is 0.

The inter prediction control unit 221 decodes, when the decoded merge flag is 0, the information in the motion estimation mode to generate the prediction image. When the merge flag is 1, on the other hand, the inter prediction control unit 221 determines, from the plurality of merge block candidates, the motion vector and the reference picture index to be used for inter prediction, based on the decoded merge block index. The inter prediction control unit 221 thus generates the prediction image. The inter prediction control unit 221 also transfers colPic information including the motion vector of the current block and the like, to the colPic memory 225.

Lastly, the decoded prediction image data and the prediction error image data are added together to generate a decoded image sequence.

Figure 14:
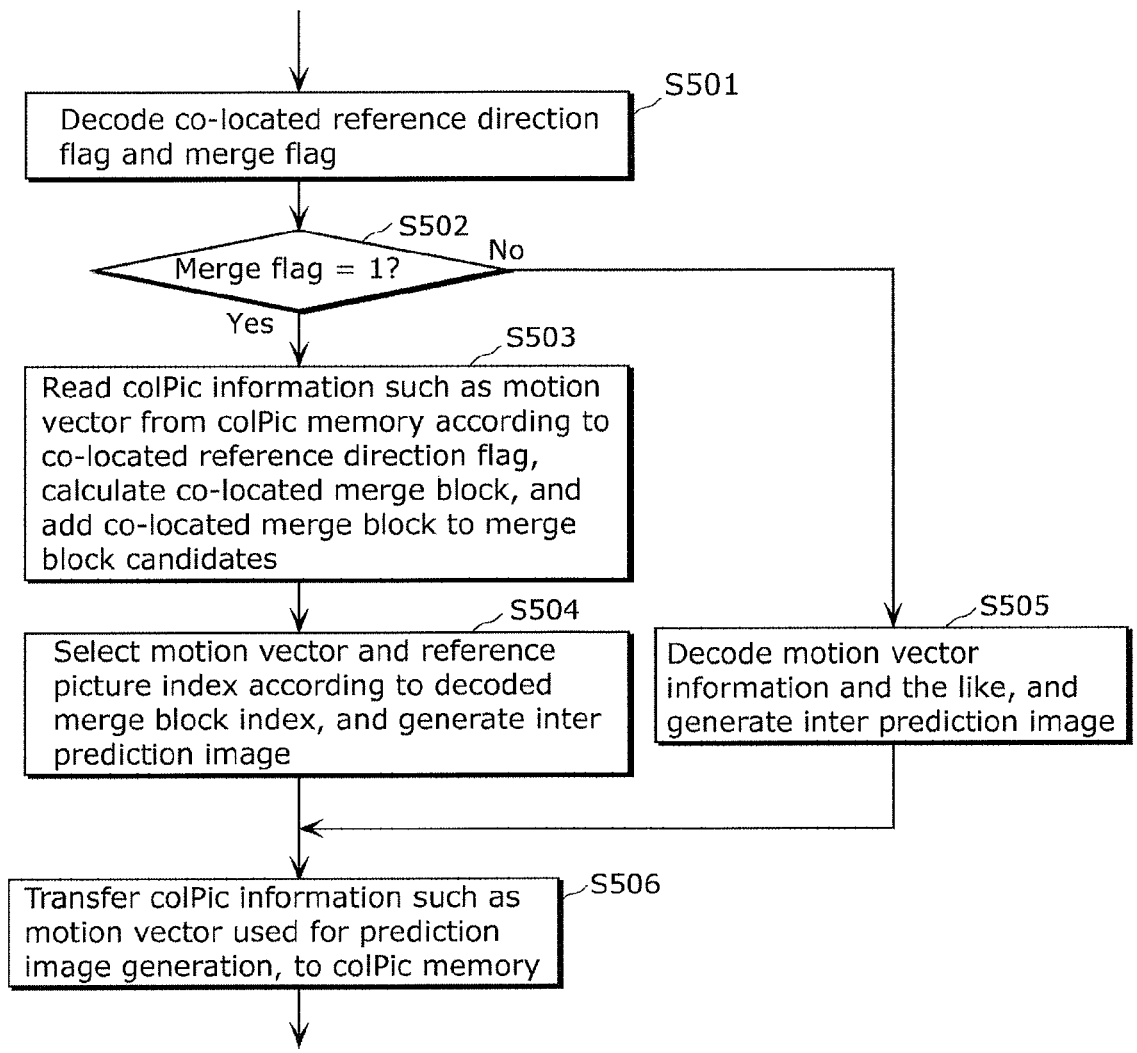
FIG. 14 is a flowchart showing an operation of the image decoding apparatus according to Embodiment 3.

FIG. 14 shows an overall procedure of the image decoding method according to this embodiment. The variable length decoding unit 205 decodes the co-located reference flag and the merge flag (Step S501).

When the merge flag is 1 (Step S502: Yes), the temporal merge motion vector calculation unit 222 reads the colPic information such as the motion vector from the colPic memory 225, based on the co-located reference flag. The temporal merge motion vector calculation unit 222 then generates the co-located merge block by the same method as in FIG. 7, and adds the co-located merge block to the merge block candidates (Step S503).

The inter prediction control unit 221 determines, according to the decoded merge block index, the merge block whose motion vector and reference picture index are to be copied, and generates the prediction image using the motion vector and the reference picture index (Step S504).

When the merge flag is 0 (Step S502: No), the inter prediction unit 212 generates the prediction image using the information in the motion estimation mode (Step S505).

The inter prediction control unit 221 transfers the colPic information including the motion vector and the like used for the inter prediction to the colPic memory 225, to store it in the colPic memory 225 (Step S506). The colPic memory 225 stores the motion vector of the reference picture, the index value of the reference picture, the prediction direction, and the like, to calculate the motion vector of the current block in the temporal direct mode.

Thus, according to this embodiment, the image decoding apparatus uses not only an adjacent block in the current picture but also decoding result information of a reference picture different from the current picture, as a merge block candidate. This enables the image decoding apparatus to appropriately decode the bitstream having high coding efficiency.

In more detail, the image decoding apparatus uses the co-located block of the current block as a merge block candidate.

For example, the image decoding apparatus copies the value of the reference picture index of the co-located block, to the reference picture index of the current block. The image decoding apparatus also uses the motion vector of the co-located block, for the motion vector of the current block. The motion vector of the co-located block is appropriately scaled according to the positional relationship between the current picture, the reference picture, colPic, and the picture referenced to by colPic.

In this way, the image decoding apparatus can appropriately decode the bitstream obtained as a result of generating optimal merge block candidates.

The image decoding apparatus according to Embodiment 3 may be an image decoding apparatus corresponding to the image coding apparatus according to Embodiment 1, or an image decoding apparatus corresponding to the image coding apparatus according to Embodiment 2. Alternatively, the image decoding apparatus according to Embodiment 3 may be an image decoding apparatus corresponding to an image coding apparatus according to the combination of Embodiments 1 and 2.

Though the image coding apparatus and the image decoding apparatus according to the present invention have been described above by way of the embodiments, the present invention is not limited to such. Other embodiments realized by application of modifications conceivable by those skilled in the art to the embodiments and any combination of the structural elements in the embodiments are also included in the present invention.

For example, a process executed by a specific processing unit may be executed by another processing unit. Processes may be executed in different order, and two or more processes may be executed in parallel.

The image coding apparatus and the image decoding apparatus according to the present invention may be realized as an image coding and decoding apparatus implemented by combining any structural elements included in the image coding apparatus and the image decoding apparatus.

The present invention may be realized not only as the image coding apparatus and the image decoding apparatus, but also as methods including steps corresponding to the processing units included in the image coding apparatus and the image decoding apparatus. The present invention may also be realized as a program for causing a computer to execute the steps included in such methods. The present invention may further be realized as a non-transitory computer-readable recording medium such as a CD-ROM on which the program is recorded.

The structural elements included in the image coding apparatus and the image decoding apparatus may be realized by LSI (Large Scale Integration) which is an integrated circuit. The structural elements may each be individually implemented as one chip, or may be partly or wholly implemented on one chip. Though LSI is mentioned here, the integrated circuit may be called an IC (Integrated Circuit), system LSI, super LSI, ultra LSI, or the like, depending on the degree of integration.

The integrated circuit method is not limited to LSI, and may be realized by a dedicated circuit or a general-purpose processor. An FPGA (Field Programmable Gate Array) which can be programmed or a reconfigurable processor which is capable of reconfiguring connections and settings of circuit cells in LSI may be used.

When an integrated circuit technology that replaces LSI emerges from development of semiconductor technologies or other derivative technologies, such a technology may be used to create integrated circuits of the structural elements included in the image coding apparatus and the image decoding apparatus.

Embodiment 4

The processing described in each of Embodiments can be simply implemented in an independent computer system, by recording, in a recording medium, a program for implementing the configurations of the moving picture coding method (the picture coding method) and the moving picture decoding method (the picture decoding method) described in each of Embodiments. The recording media may be any recording media as long as the program can be recorded, such as a magnetic disk, an optical disk, a magnetic optical disk, an IC card, and a semiconductor memory.

Hereinafter, the applications to the moving picture coding method (the picture coding method) and the moving picture decoding method (the picture decoding method) described in each of Embodiments and systems using them will be described. This system is characterized by including a picture coding and decoding apparatus composed of the picture coding apparatus using the picture coding method and the picture decoding apparatus using the picture decoding method. The other structure of the system can be appropriately changed depending on situations.

Figure 15:
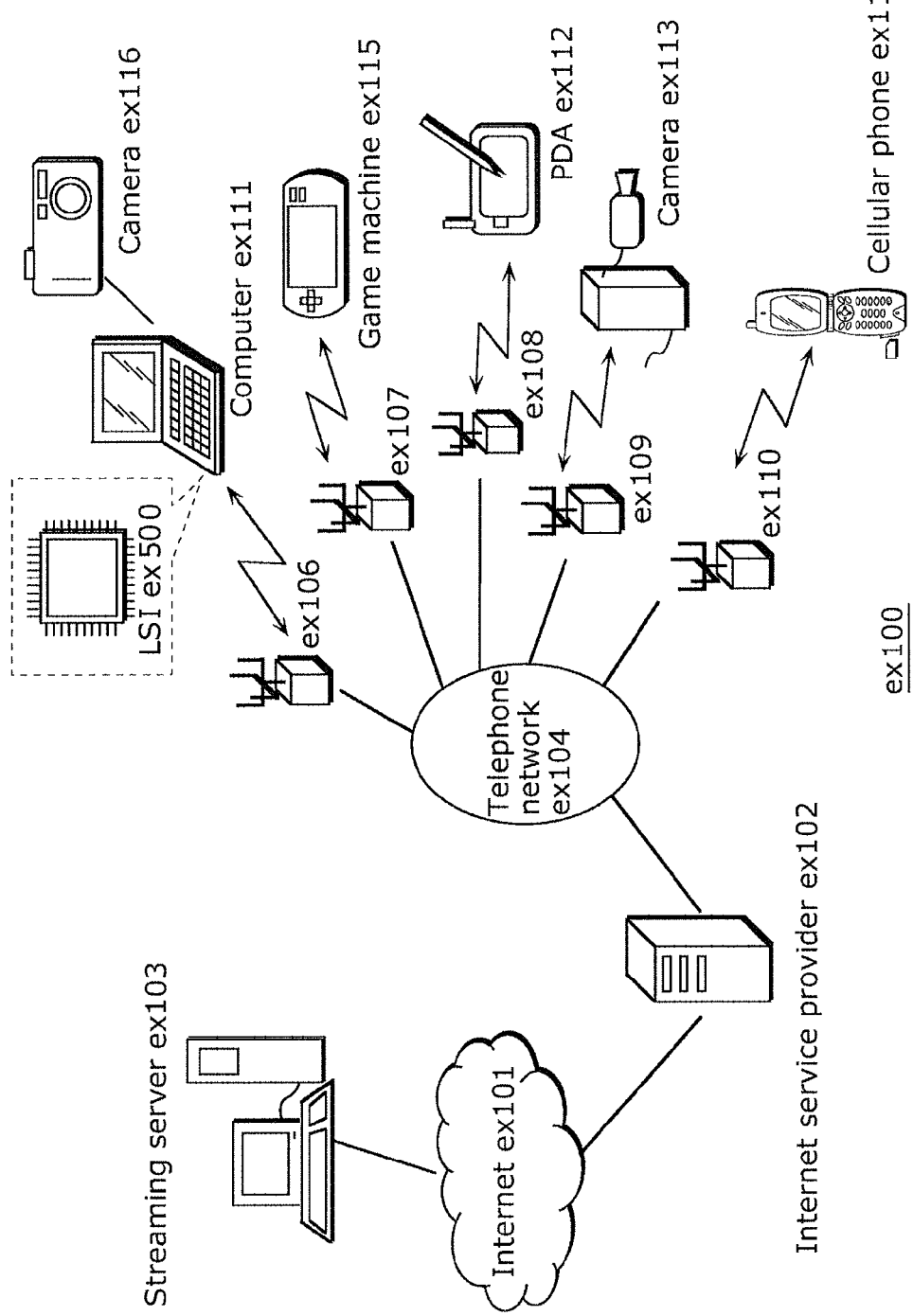
FIG. 15 illustrates an overall configuration of a content providing system for implementing content distribution services.

FIG. 15 illustrates an overall configuration of a content providing system ex100 for implementing content distribution services. The area for providing communication services is divided into cells of desired size, and base stations ex106, ex107, ex108, ex109, and ex110 which are fixed wireless stations are placed in each of the cells.

The content providing system ex100 is connected to devices, such as a computer ex111, a personal digital assistant (PDA) ex112, a camera ex113, a cellular phone ex114 and a game machine ex115, via the Internet ex101, an Internet service provider ex102, a telephone network ex104, as well as the base stations ex106 to ex110, respectively.

However, the configuration of the content providing system ex100 is not limited to the configuration shown in FIG. 15, and a combination in which any of the elements are connected is acceptable. In addition, each device may be directly connected to the telephone network ex104, rather than via the base stations ex106 to ex110 which are the fixed wireless stations. Furthermore, the devices may be interconnected to each other via a short distance wireless communication and others.

The camera ex113, such as a digital video camera, is capable of capturing video. A camera ex116, such as a digital video camera, is capable of capturing both still images and video. Furthermore, the cellular phone ex114 may be the one that meets any of the standards such as Global System for Mobile Communications (GSM®), Code Division Multiple Access (CDMA), Wideband-Code Division Multiple Access (W-CDMA), Long Term Evolution (LTE), and High Speed Packet Access (HSPA). Alternatively, the cellular phone ex114 may be a Personal Handyphone System (PHS).

In the content providing system ex100, a streaming server ex103 is connected to the camera ex113 and others via the telephone network ex104 and the base station ex109, which enables distribution of images of a live show and others. In such a distribution, a content (for example, video of a music live show) captured by the user using the camera ex113 is coded as described above in each of Embodiments (that is, the system functions as the picture coding apparatus according to an implementation of the present invention), and the coded content is transmitted to the streaming server ex103. On the other hand, the streaming server ex103 carries out stream distribution of the transmitted content data to the clients upon their requests. The clients include the computer ex111, the PDA ex112, the camera ex113, the cellular phone ex114, and the game machine ex115 that are capable of decoding the above-mentioned coded data. Each of the devices that have received the distributed data decodes and reproduces the coded data (that is, the system functions as the picture decoding apparatus according to the implementation of the present invention).

The captured data may be coded by the camera ex113 or the streaming server ex103 that transmits the data, or the coding processes may be shared between the camera ex113 and the streaming server ex103. Similarly, the distributed data may be decoded by the clients or the streaming server ex103, or the decoding processes may be shared between the clients and the streaming server ex103. Furthermore, the data of the still images and video captured by not only the camera ex113 but also the camera ex116 may be transmitted to the streaming server ex103 through the computer ex111. The coding processes may be performed by the camera ex116, the computer ex111, or the streaming server ex103, or shared among them.

Furthermore, the coding and decoding processes may be performed by an LSI ex500 generally included in each of the computer ex111 and the devices. The LSI ex500 may be configured of a single chip or a plurality of chips. Software for coding and decoding video may be integrated into some type of a recording medium (such as a CD-ROM, a flexible disk, and a hard disk) that is readable by the computer ex111 and others, and the coding and decoding processes may be performed using the software. Furthermore, when the cellular phone ex114 is equipped with a camera, the image data obtained by the camera may be transmitted. The video data is data coded by the LSI ex500 included in the cellular phone ex114.

Furthermore, the streaming server ex103 may be composed of servers and computers, and may decentralize data and process the decentralized data, record, or distribute data.

As described above, the clients may receive and reproduce the coded data in the content providing system ex100. In other words, the clients can receive and decode information transmitted by the user, and reproduce the decoded data in real time in the content providing system ex100, so that the user who does not have any particular right and equipment can implement personal broadcasting.

Figure 16:
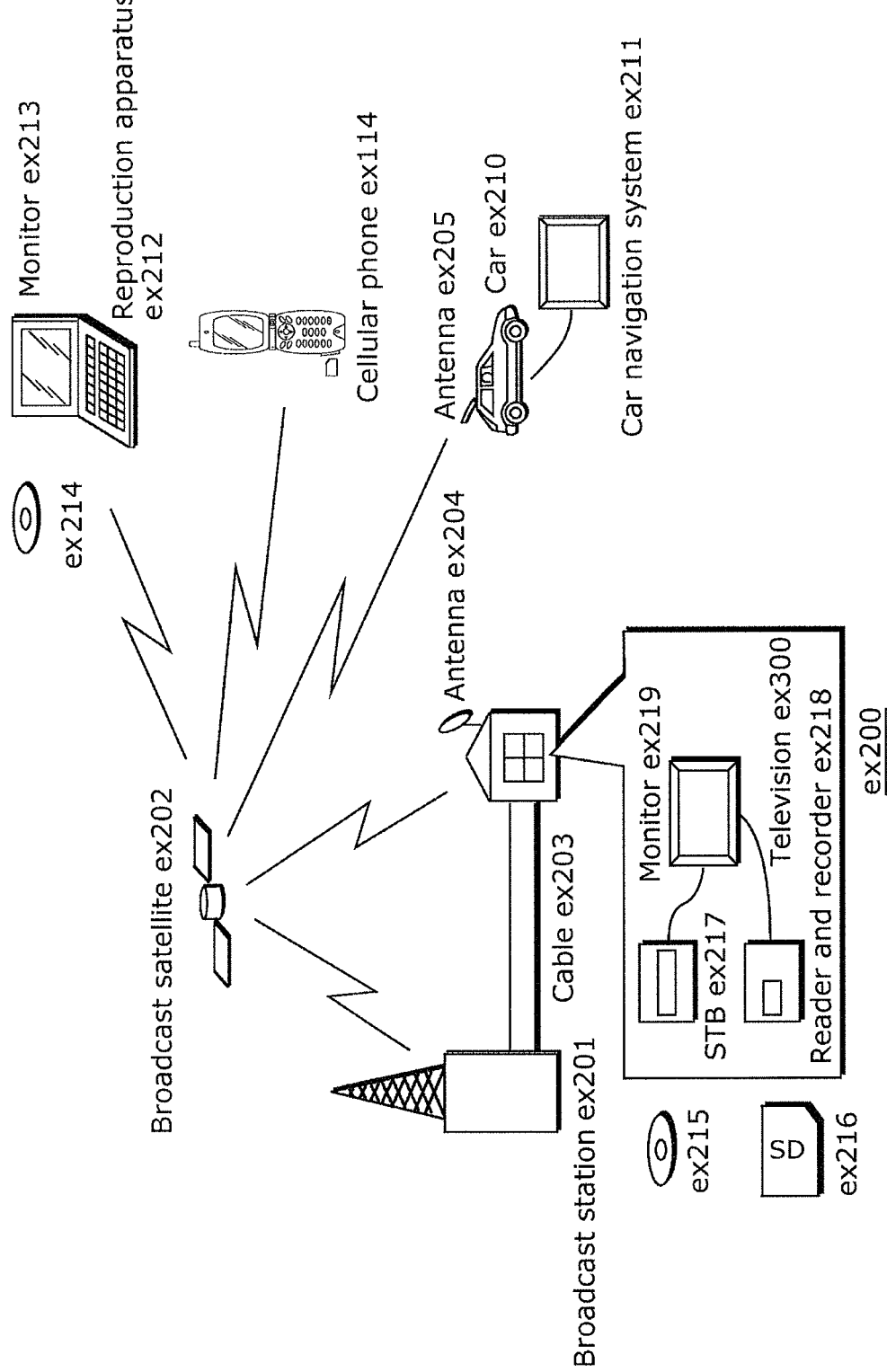
FIG. 16 illustrates an overall configuration of a digital broadcasting system.

Aside from the example of the content providing system ex100, at least one of the moving picture coding apparatus (the picture coding apparatus) and the moving picture decoding apparatus (the picture decoding apparatus) described in each of Embodiments may be implemented in a digital broadcasting system ex200 illustrated in FIG. 16. More specifically, a broadcast station ex201 communicates or transmits, via radio waves to a broadcast satellite ex202, multiplexed data obtained by multiplexing audio data and others onto video data. The video data is data coded by the moving picture coding method described in each of Embodiments (that is, the video data is data coded by the picture coding apparatus according to an implementation of the present invention). Upon receipt of the multiplexed data, the broadcast satellite ex202 transmits radio waves for broadcasting. Then, a home-use antenna ex204 with a satellite broadcast reception function receives the radio waves. Next, a device such as a television (receiver) ex300 and a set top box (STB) ex217 decodes the received multiplexed data, and reproduces the decoded data (that is, the system functions as the picture decoding apparatus according to an implementation of the present invention).

Furthermore, a reader/recorder ex218 (i) reads and decodes the multiplexed data recorded on a recording media ex215, such as a DVD and a BD, or (ii) codes video signals in the recording medium ex215, and in some cases, writes data obtained by multiplexing an audio signal on the coded data. The reader/recorder ex218 can include the moving picture decoding apparatus or the moving picture coding apparatus as shown in each of Embodiments. In this case, the reproduced video signals are displayed on the monitor ex219, and can be reproduced by another device or system using the recording medium ex215 on which the multiplexed data is recorded. It is also possible to implement the moving picture decoding apparatus in the set top box ex217 connected to the cable ex203 for a cable television or to the antenna ex204 for satellite and/or terrestrial broadcasting, so as to display the video signals on the monitor ex219 of the television ex300. The moving picture decoding apparatus may be implemented not in the set top box but in the television ex300.

Figure 17:
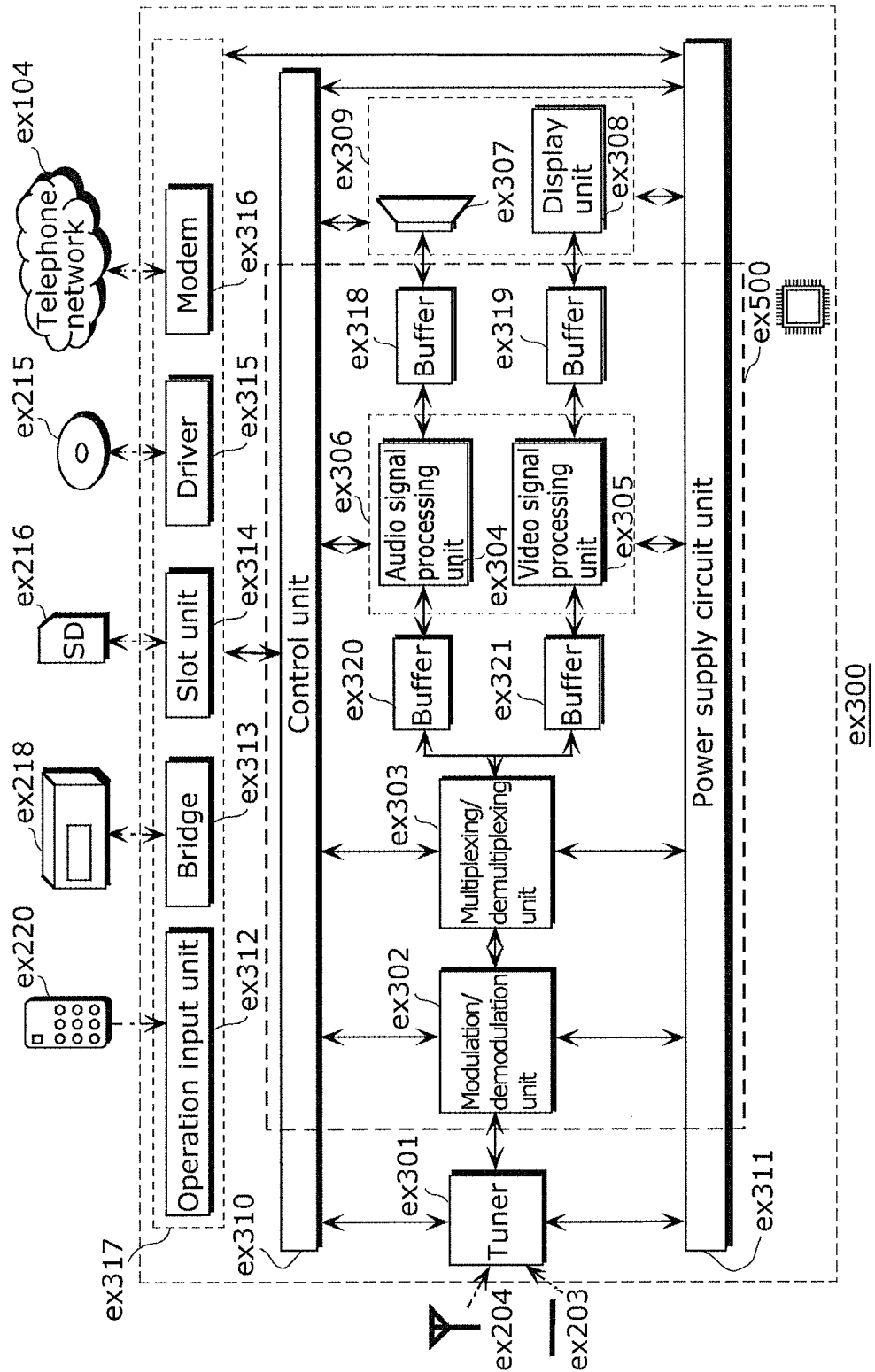
FIG. 17 is a block diagram illustrating an example of a configuration of a television.

FIG. 17 illustrates the television (receiver) ex300 that uses the moving picture coding method and the moving picture decoding method described in each of Embodiments. The television ex300 includes: a tuner ex301 that obtains or provides multiplexed data obtained by multiplexing audio data onto video data, through the antenna ex204 or the cable ex203, etc. that receives a broadcast; a modulation/demodulation unit ex302 that demodulates the received multiplexed data or modulates data into multiplexed data to be supplied outside; and a multiplexing/demultiplexing unit ex303 that demultiplexes the modulated multiplexed data into video data and audio data, or multiplexes video data and audio data coded by a signal processing unit ex306 into data.

The television ex300 further includes: a signal processing unit ex306 including an audio signal processing unit ex304 and a video signal processing unit ex305 (functioning as the picture coding apparatus or the picture decoding apparatus according to an implementation of the present invention) that decode audio data and video data and code audio data and video data, respectively; and an output unit ex309 including a speaker ex307 that provides the decoded audio signal, and a display unit ex308 that displays the decoded video signal, such as a display. Furthermore, the television ex300 includes an interface unit ex317 including an operation input unit ex312 that receives an input of a user operation. Furthermore, the television ex300 includes a control unit ex310 that controls overall each constituent element of the television ex300, and a power supply circuit unit ex311 that supplies power to each of the elements. Other than the operation input unit ex312, the interface unit ex317 may include: a bridge ex313 that is connected to an external device, such as the reader/recorder ex218; a slot unit ex314 for enabling attachment of the recording medium ex216, such as an SD card; a driver ex315 to be connected to an external recording medium, such as a hard disk; and a modem ex316 to be connected to a telephone network. Here, the recording medium ex216 can electrically record information using a non-volatile/volatile semiconductor memory element for storage. The constituent elements of the television ex300 are connected to each other through a synchronous bus.

First, the configuration in which the television ex300 decodes multiplexed data obtained from outside through the antenna ex204 and others and reproduces the decoded data will be described. In the television ex300, upon a user operation through a remote controller ex220 and others, the multiplexing/demultiplexing unit ex303 demultiplexes the multiplexed data demodulated by the modulation/demodulation unit ex302, under control of the control unit ex310 including a CPU. Furthermore, the audio signal processing unit ex304 decodes the demultiplexed audio data, and the video signal processing unit ex305 decodes the demultiplexed video data, using the decoding method described in each of Embodiments, in the television ex300. The output unit ex309 provides the decoded video signal and audio signal outside, respectively. When the output unit ex309 provides the video signal and the audio signal, the signals may be temporarily stored in buffers ex318 and ex319, and others so that the signals are reproduced in synchronization with each other. Furthermore, the television ex300 may read multiplexed data not through a broadcast and others but from the recording media ex215 and ex216, such as a magnetic disk, an optical disk, and a SD card. Next, a configuration in which the television ex300 codes an audio signal and a video signal, and transmits the data outside or writes the data on a recording medium will be described. In the television ex300, upon a user operation through the remote controller ex220 and others, the audio signal processing unit ex304 codes an audio signal, and the video signal processing unit ex305 codes a video signal, under control of the control unit ex310 using the coding method described in each of Embodiments. The multiplexing/demultiplexing unit ex303 multiplexes the coded video signal and audio signal, and provides the resulting signal outside. When the multiplexing/demultiplexing unit ex303 multiplexes the video signal and the audio signal, the signals may be temporarily stored in the buffers ex320 and ex321, and others so that the signals are reproduced in synchronization with each other. Here, the buffers ex318, ex319, ex320, and ex321 may be plural as illustrated, or at least one buffer may be shared in the television ex300. Furthermore, although not illustrate, data may be stored in a buffer so that the system overflow and underflow may be avoided between the modulation/demodulation unit ex302 and the multiplexing/demultiplexing unit ex303, for example.

Furthermore, the television ex300 may include a configuration for receiving an AV input from a microphone or a camera other than the configuration for obtaining audio and video data from a broadcast or a recording medium, and may code the obtained data. Although the television ex300 can code, multiplex, and provide outside data in the description, it may be capable of only receiving, decoding, and providing outside data but not the coding, multiplexing, and providing outside data.

Furthermore, when the reader/recorder ex218 reads or writes multiplexed data from or on a recording medium, one of the television ex300 and the reader/recorder ex218 may decode or code the multiplexed data, and the television ex300 and the reader/recorder ex218 may share the decoding or coding.

Figure 18:
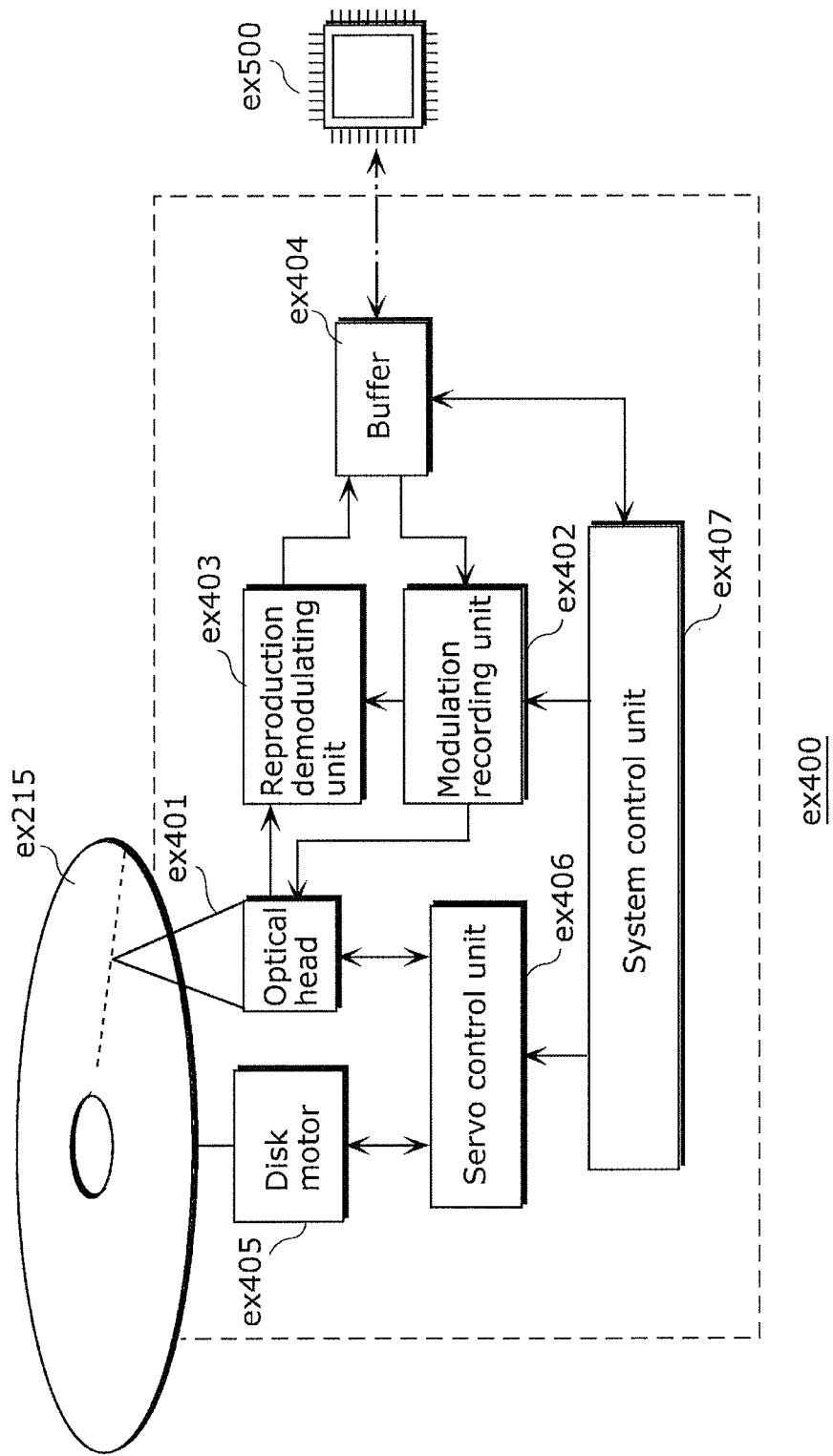
FIG. 18 is a block diagram illustrating an example of a configuration of an information reproducing/recording unit that reads and writes information from or on a recording medium that is an optical disk.

As an example, FIG. 18 illustrates a configuration of an information reproducing/recording unit ex400 when data is read or written from or on an optical disk. The information reproducing/recording unit ex400 includes constituent elements ex401, ex402, ex403, ex404, ex405, ex406, and ex407 to be described hereinafter. The optical head ex401 irradiates a laser spot in a recording surface of the recording medium ex215 that is an optical disk to write information, and detects reflected light from the recording surface of the recording medium ex215 to read the information. The modulation recording unit ex402 electrically drives a semiconductor laser included in the optical head ex401, and modulates the laser light according to recorded data. The reproduction demodulating unit ex403 amplifies a reproduction signal obtained by electrically detecting the reflected light from the recording surface using a photo detector included in the optical head ex401, and demodulates the reproduction signal by separating a signal component recorded on the recording medium ex215 to reproduce the necessary information. The buffer ex404 temporarily holds the information to be recorded on the recording medium ex215 and the information reproduced from the recording medium ex215. The disk motor ex405 rotates the recording medium ex215. The servo control unit ex406 moves the optical head ex401 to a predetermined information track while controlling the rotation drive of the disk motor ex405 so as to follow the laser spot. The system control unit ex407 controls overall the information reproducing/recording unit ex400. The reading and writing processes can be implemented by the system control unit ex407 using various information stored in the buffer ex404 and generating and adding new information as necessary, and by the modulation recording unit ex402, the reproduction demodulating unit ex403, and the servo control unit ex406 that record and reproduce information through the optical head ex401 while being operated in a coordinated manner. The system control unit ex407 includes, for example, a microprocessor, and executes processing by causing a computer to execute a program for read and write.

Although the optical head ex401 irradiates a laser spot in the description, it may perform high-density recording using near field light.

Figure 19:
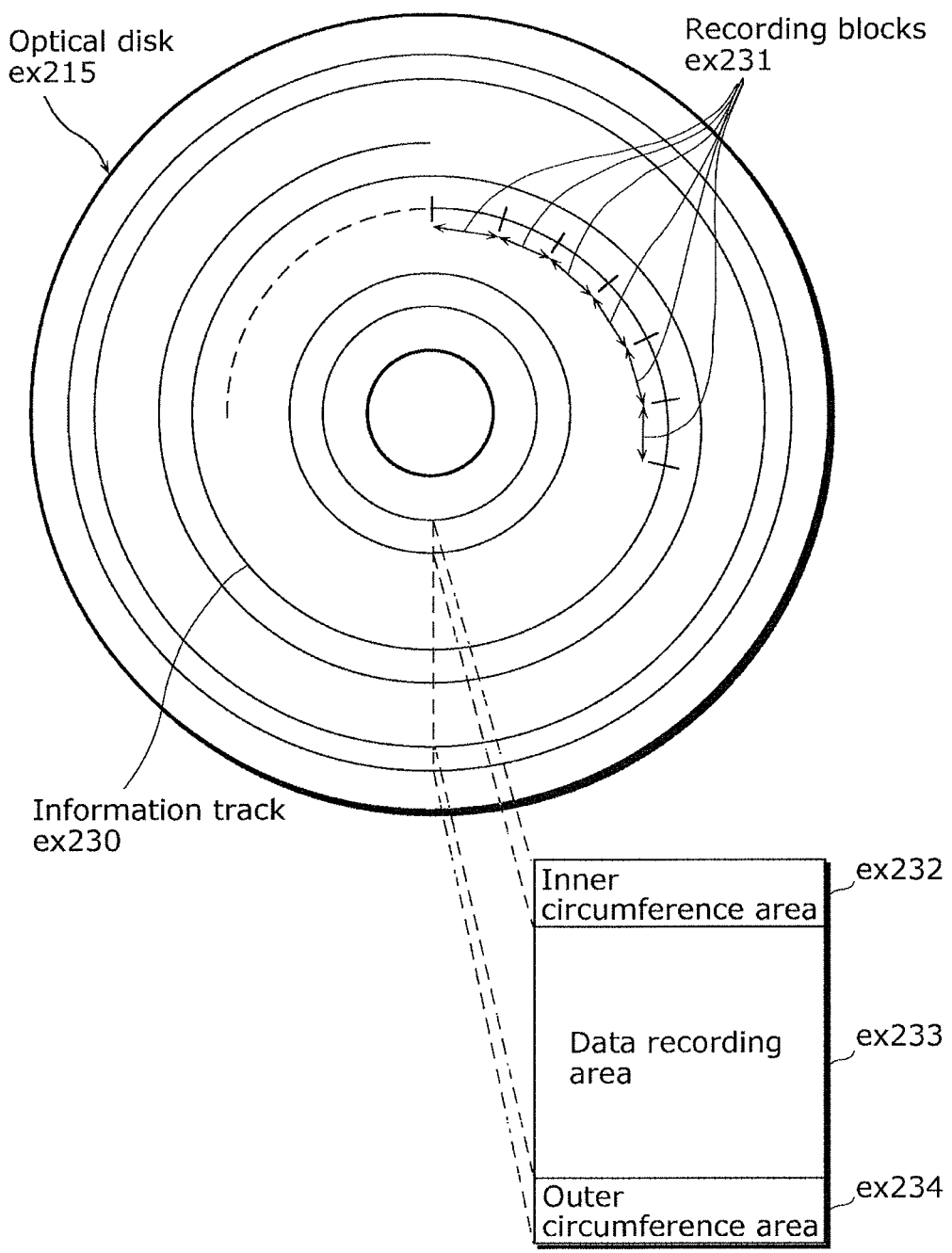
FIG. 19 shows an example of a configuration of a recording medium that is an optical disk.

FIG. 19 illustrates the recording medium ex215 that is the optical disk. On the recording surface of the recording medium ex215, guide grooves are spirally formed, and an information track ex230 records, in advance, address information indicating an absolute position on the disk according to change in a shape of the guide grooves. The address information includes information for determining positions of recording blocks ex231 that are a unit for recording data. Reproducing the information track ex230 and reading the address information in an apparatus that records and reproduces data can lead to determination of the positions of the recording blocks. Furthermore, the recording medium ex215 includes a data recording area ex233, an inner circumference area ex232, and an outer circumference area ex234. The data recording area ex233 is an area for use in recording the user data. The inner circumference area ex232 and the outer circumference area ex234 that are inside and outside of the data recording area ex233, respectively are for specific use except for recording the user data. The information reproducing/recording unit 400 reads and writes coded audio, coded video data, or multiplexed data obtained by multiplexing the coded audio and video data, from and on the data recording area ex233 of the recording medium ex215.

Although an optical disk having a layer, such as a DVD and a BD is described as an example in the description, the optical disk is not limited to such, and may be an optical disk having a multilayer structure and capable of being recorded on a part other than the surface. Furthermore, the optical disk may have a structure for multidimensional recording/reproduction, such as recording of information using light of colors with different wavelengths in the same portion of the optical disk and for recording information having different layers from various angles.

Furthermore, a car ex210 having an antenna ex205 can receive data from the satellite ex202 and others, and reproduce video on a display device such as a car navigation system ex211 set in the car ex210, in the digital broadcasting system ex200. Here, a configuration of the car navigation system ex211 will be a configuration, for example, including a GPS receiving unit from the configuration illustrated in FIG. 17. The same will be true for the configuration of the computer ex111, the cellular phone ex114, and others.

Figure 20A:
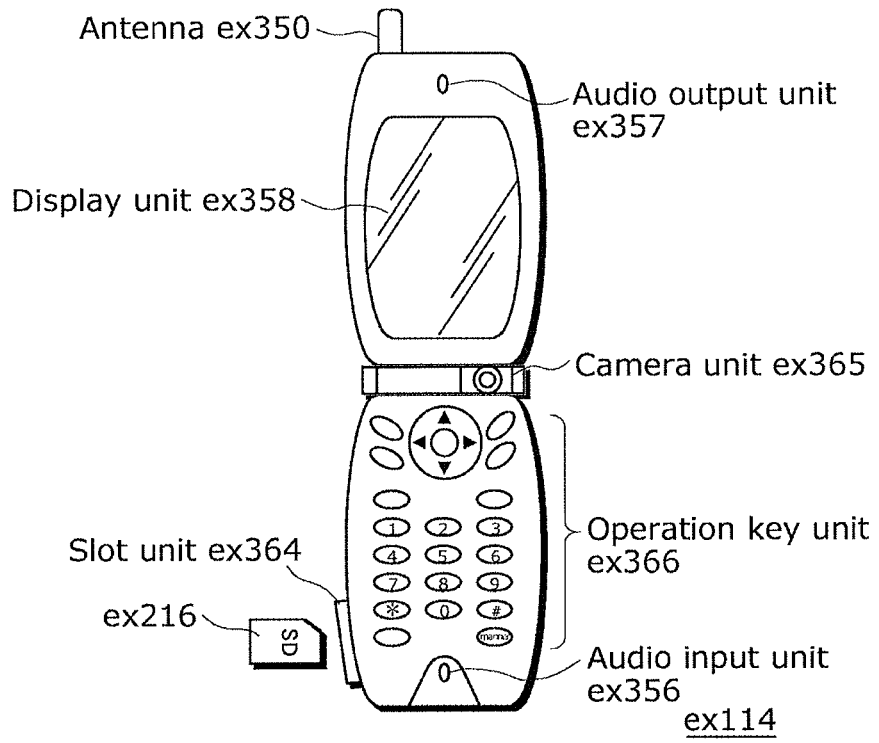
FIG. 20A shows an example of a cellular phone.

FIG. 20A illustrates the cellular phone ex114 that uses the moving picture coding method and the moving picture decoding method described in Embodiments. The cellular phone ex114 includes: an antenna ex350 for transmitting and receiving radio waves through the base station ex110; a camera unit ex365 capable of capturing moving and still images; and a display unit ex358 such as a liquid crystal display for displaying the data such as decoded video captured by the camera unit ex365 or received by the antenna ex350. The cellular phone ex114 further includes: a main body unit including an operation key unit ex366; an audio output unit ex357 such as a speaker for output of audio; an audio input unit ex356 such as a microphone for input of audio; a memory unit ex367 for storing captured video or still pictures, recorded audio, coded or decoded data of the received video, the still pictures, e-mails, or others; and a slot unit ex364 that is an interface unit for a recording medium that stores data in the same manner as the memory unit ex367.

Figure 20B:
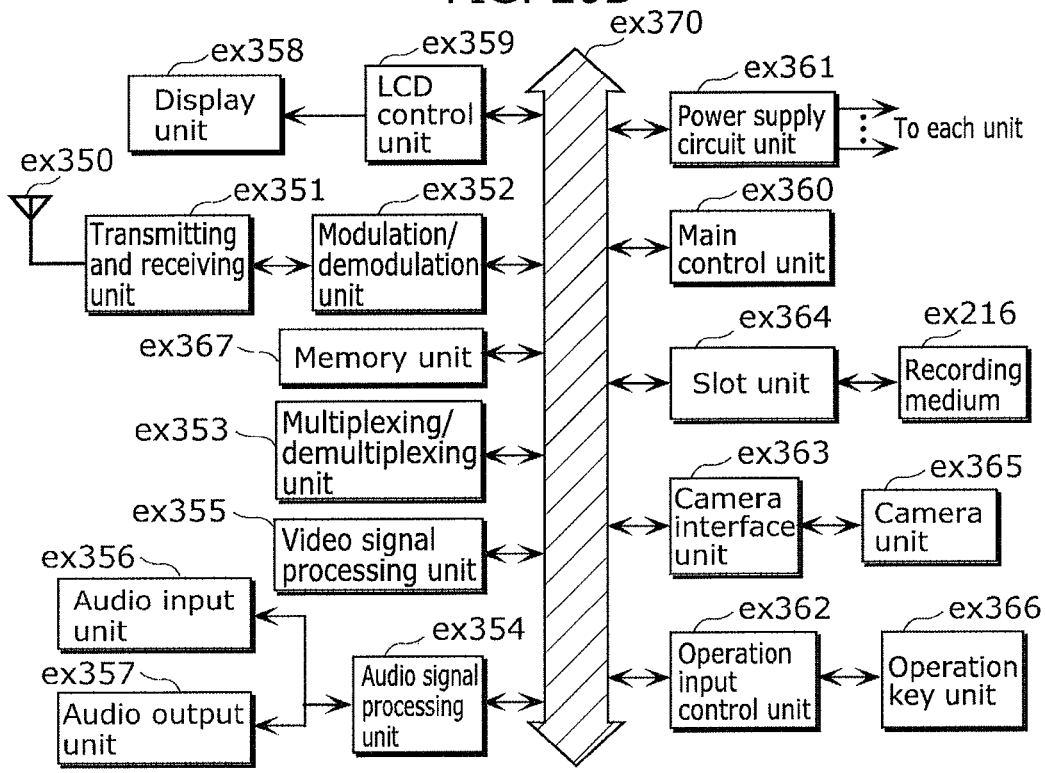
FIG. 20B shows an example of a configuration of the cellular phone.

Next, an example of a configuration of the cellular phone ex114 will be described with reference to FIG. 20B. In the cellular phone ex114, a main control unit ex360 designed to control overall each unit of the main body including the display unit ex358 as well as the operation key unit ex366 is connected mutually, via a synchronous bus ex370, to a power supply circuit unit ex361, an operation input control unit ex362, a video signal processing unit ex355, a camera interface unit ex363, a liquid crystal display (LCD) control unit ex359, a modulation/demodulation unit ex352, a multiplexing/demultiplexing unit ex353, an audio signal processing unit ex354, the slot unit ex364, and the memory unit ex367.

When a call-end key or a power key is turned ON by a user's operation, the power supply circuit unit ex361 supplies the respective units with power from a battery pack so as to activate the cell phone ex114.

In the cellular phone ex114, the audio signal processing unit ex354 converts the audio signals collected by the audio input unit ex356 in voice conversation mode into digital audio signals under the control of the main control unit ex360 including a CPU, ROM, and RAM. Then, the modulation/demodulation unit ex352 performs spread spectrum processing on the digital audio signals, and the transmitting and receiving unit ex351 performs digital-to-analog conversion and frequency conversion on the data, so as to transmit the resulting data via the antenna ex350. Also, in the cellular phone ex114, the transmitting and receiving unit ex351 amplifies the data received by the antenna ex350 in voice conversation mode and performs frequency conversion and the analog-to-digital conversion on the data. Then, the modulation/demodulation unit ex352 performs inverse spread spectrum processing on the data, and the audio signal processing unit ex354 converts it into analog audio signals, so as to output them via the audio output unit ex357.

Furthermore, when an e-mail in data communication mode is transmitted, text data of the e-mail inputted by operating the operation key unit ex366 and others of the main body is sent out to the main control unit ex360 via the operation input control unit ex362. The main control unit ex360 causes the modulation/demodulation unit ex352 to perform spread spectrum processing on the text data, and the transmitting and receiving unit ex351 performs the digital-to-analog conversion and the frequency conversion on the resulting data to transmit the data to the base station ex110 via the antenna ex350. When an e-mail is received, processing that is approximately inverse to the processing for transmitting an e-mail is performed on the received data, and the resulting data is provided to the display unit ex358.

When video, still images, or video and audio in data communication mode is or are transmitted, the video signal processing unit ex355 compresses and codes video signals supplied from the camera unit ex365 using the moving picture coding method shown in each of Embodiments (that is, the video signal processing unit ex355 functions as the picture coding apparatus according to an implementation of the present invention), and transmits the coded video data to the multiplexing/demultiplexing unit ex353. In contrast, during when the camera unit ex365 captures video, still images, and others, the audio signal processing unit ex354 codes audio signals collected by the audio input unit ex356, and transmits the coded audio data to the multiplexing/demultiplexing unit ex353.

The multiplexing/demultiplexing unit ex353 multiplexes the coded video data supplied from the video signal processing unit ex355 and the coded audio data supplied from the audio signal processing unit ex354, using a predetermined method. Then, the modulation/demodulation unit (the modulation/demodulation circuit unit) ex352 performs spread spectrum processing on the multiplexed data, and the transmitting and receiving unit ex351 performs digital-to-analog conversion and frequency conversion on the data so as to transmit the resulting data via the antenna ex350.

When receiving data of a video file which is linked to a Web page and others in data communication mode or when receiving an e-mail with video and/or audio attached, in order to decode the multiplexed data received via the antenna ex350, the multiplexing/demultiplexing unit ex353 demultiplexes the multiplexed data into a video data bit stream and an audio data bit stream, and supplies the video signal processing unit ex355 with the coded video data and the audio signal processing unit ex354 with the coded audio data, through the synchronous bus ex370. The video signal processing unit ex355 decodes the video signal using a moving picture decoding method corresponding to the coding method shown in each of Embodiments (that is, the video signal processing unit ex355 functions as the picture decoding apparatus according to an aspect of the present invention), and then the display unit ex358 displays, for instance, the video and still images included in the video file linked to the Web page via the LCD control unit ex359. Furthermore, the audio signal processing unit ex354 decodes the audio signal, and the audio output unit ex357 provides the audio.

Furthermore, similarly to the television ex300, a terminal such as the cellular phone ex114 probably have 3 types of implementation configurations including not only (i) a transmitting and receiving terminal including both a coding apparatus and a decoding apparatus, but also (ii) a transmitting terminal including only a coding apparatus and (iii) a receiving terminal including only a decoding apparatus. Although the digital broadcasting system ex200 receives and transmits the multiplexed data obtained by multiplexing audio data onto video data in the description, the multiplexed data may be data obtained by multiplexing not audio data but character data related to video onto video data, and may be not multiplexed data but video data itself.

As such, the moving picture coding method and the moving picture decoding method in each of Embodiments can be used in any of the devices and systems described. Thus, the advantages described in each of Embodiments can be obtained.

Furthermore, the present invention is not limited to Embodiments, and various modifications and revisions are possible without departing from the scope of the present invention.

Embodiment 5

Video data can be generated by switching, as necessary, between (i) the moving picture coding method or the moving picture coding apparatus shown in each of Embodiments and (ii) a moving picture coding method or a moving picture coding apparatus in conformity with a different standard, such as MPEG-2, MPEG4-AVC, and VC-1.

Here, when a plurality of video data that conforms to the different standards is generated and is then decoded, the decoding methods need to be selected to conform to the different standards. However, since to which standard each of the plurality of the video data to be decoded conforms cannot be detected, there is a problem that an appropriate decoding method cannot be selected.

In order to solve the problem, multiplexed data obtained by multiplexing audio data and others onto video data has a structure including identification information indicating to which standard the video data conforms. The specific structure of the multiplexed data including the video data generated in the moving picture coding method and by the moving picture coding apparatus shown in each of Embodiments will be hereinafter described. The multiplexed data is a digital stream in the MPEG2-Transport Stream format.

FIG. 21 illustrates a structure of the multiplexed data. As illustrated in FIG. 21, the multiplexed data can be obtained by multiplexing at least one of a video stream, an audio stream, a presentation graphics stream (PG), and an interactive graphics stream. The video stream represents primary video and secondary video of a movie, the audio stream (IG) represents a primary audio part and a secondary audio part to be mixed with the primary audio part, and the presentation graphics stream represents subtitles of the movie. Here, the primary video is normal video to be displayed on a screen, and the secondary video is video to be displayed on a smaller window in the primary video. Furthermore, the interactive graphics stream represents an interactive screen to be generated by arranging the GUI components on a screen. The video stream is coded in the moving picture coding method or by the moving picture coding apparatus shown in each of Embodiments, or in a moving picture coding method or by a moving picture coding apparatus in conformity with a conventional standard, such as MPEG-2, MPEG4-AVC, and VC-1. The audio stream is coded in accordance with a standard, such as Dolby-AC-3, Dolby Digital Plus, MLP, DTS, DTS-HD, and linear PCM.

Each stream included in the multiplexed data is identified by PID. For example, 0x1011 is allocated to the video stream to be used for video of a movie, 0x1100 to 0x111F are allocated to the audio streams, 0x1200 to 0x121F are allocated to the presentation graphics streams, 0x1400 to 0x141F are allocated to the interactive graphics streams, 0x1B00 to 0x1B1F are allocated to the video streams to be used for secondary video of the movie, and 0x1A00 to 0x1A1F are allocated to the audio streams to be used for the secondary video to be mixed with the primary audio.

Figure 22:
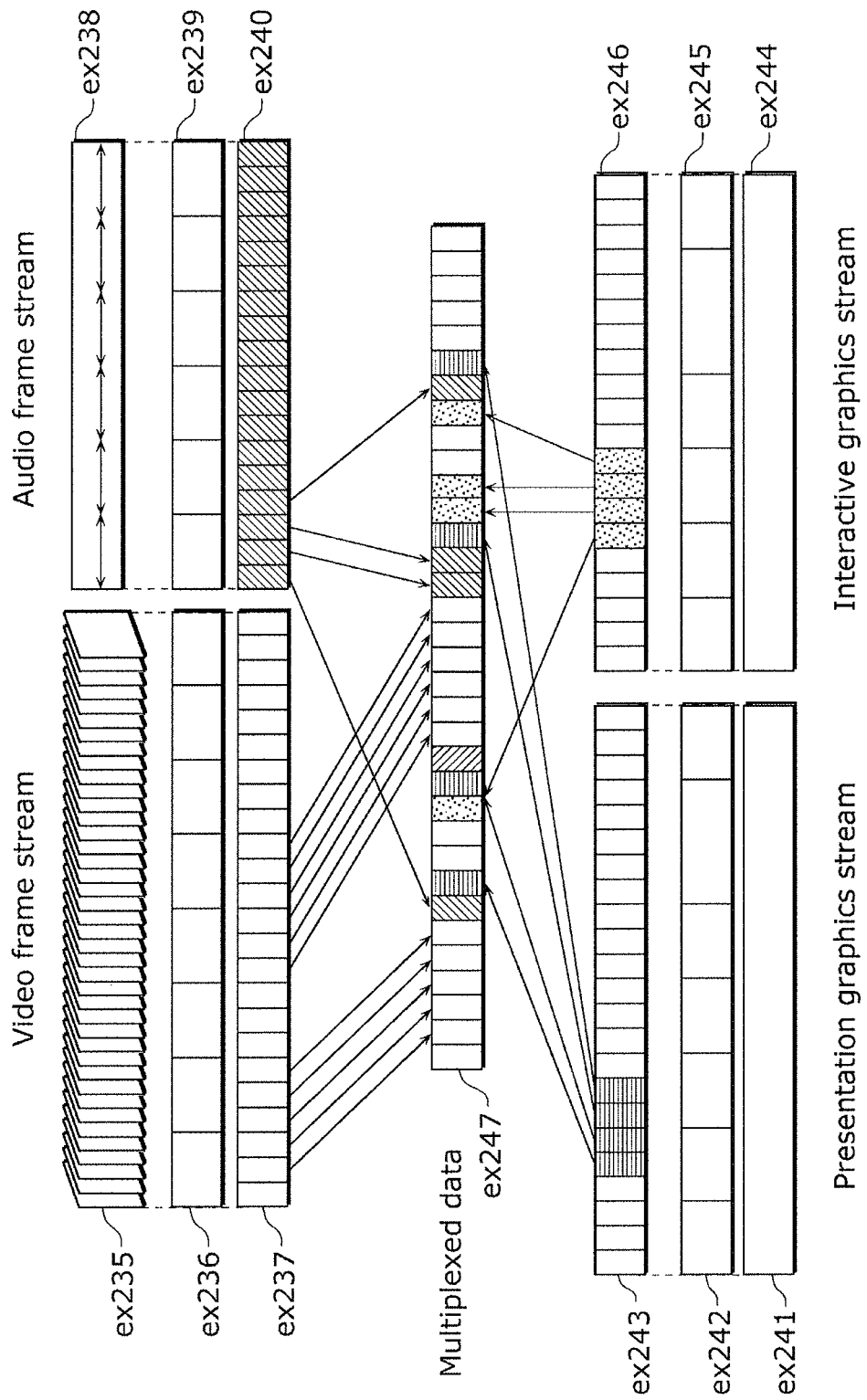
FIG. 22 schematically illustrates how each of streams is multiplexed in multiplexed data.

FIG. 22 schematically illustrates how data is multiplexed. First, a video stream ex235 composed of video frames and an audio stream ex238 composed of audio frames are transformed into a stream of PES packets ex236 and a stream of PES packets ex239, and further into TS packets ex237 and TS packets ex240, respectively. Similarly, data of a presentation graphics stream ex241 and data of an interactive graphics stream ex244 are transformed into a stream of PES packets ex242 and a stream of PES packets ex245, and further into TS packets ex243 and TS packets ex246, respectively. These TS packets are multiplexed into a stream to obtain multiplexed data ex247.

Figure 23:
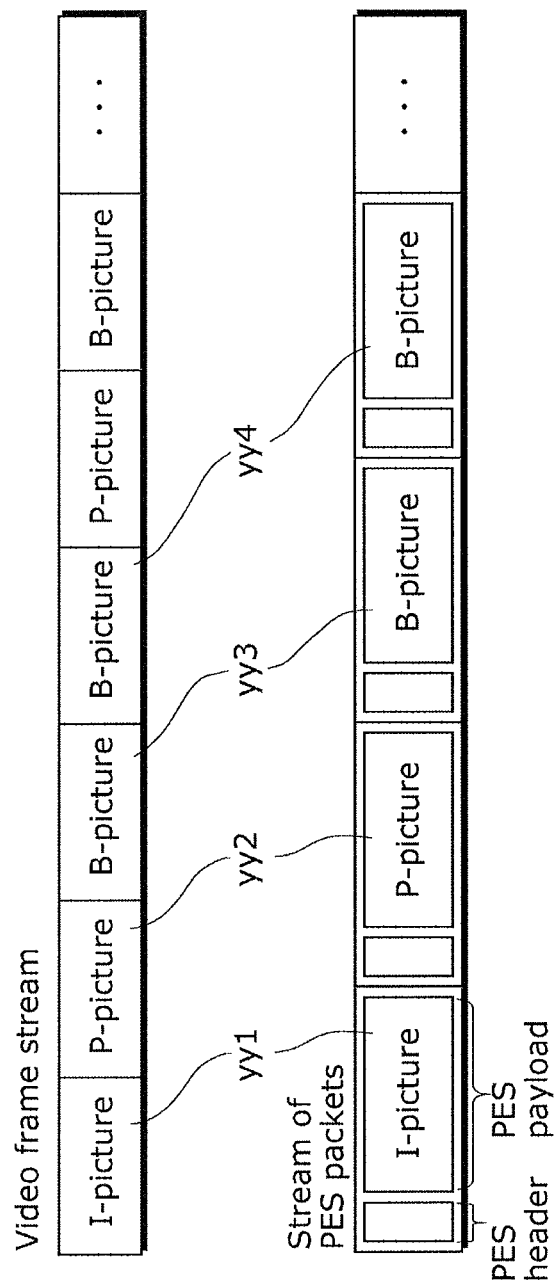
FIG. 23 illustrates how a video stream is stored in a stream of PES packets in more detail.

FIG. 23 illustrates how a video stream is stored in a stream of PES packets in more detail. The first bar in FIG. 23 shows a video frame stream in a video stream. The second bar shows the stream of PES packets. As indicated by arrows denoted as yy1, yy2, yy3, and yy4 in FIG. 23, the video stream is divided into pictures as I-pictures, B-pictures, and P-pictures each of which is a video presentation unit, and the pictures are stored in a payload of each of the PES packets. Each of the PES packets has a PES header, and the PES header stores a Presentation Time-Stamp (PTS) indicating a display time of the picture, and a Decoding Time-Stamp (DTS) indicating a decoding time of the picture.

Figure 24:
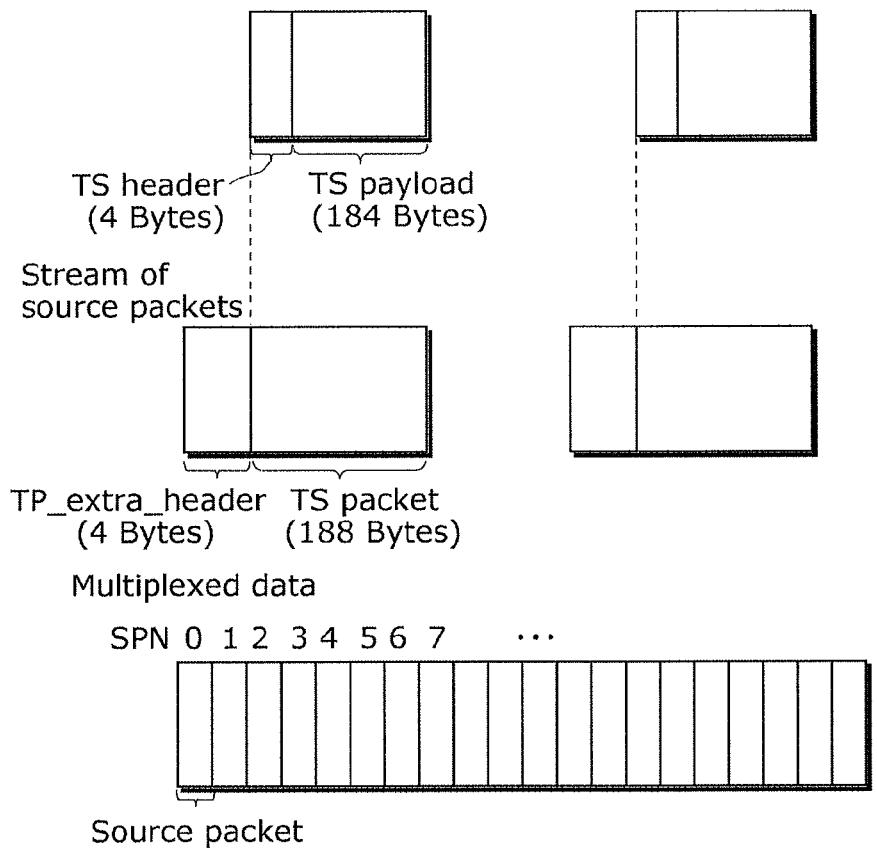
FIG. 24 shows a structure of TS packets and source packets in the multiplexed data.

FIG. 24 illustrates a format of TS packets to be finally written on the multiplexed data. Each of the TS packets is a 188-byte fixed length packet including a 4-byte TS header having information, such as a PID for identifying a stream and a 184-byte TS payload for storing data. The PES packets are divided, and stored in the TS payloads, respectively. When a BD ROM is used, each of the TS packets is given a 4-byte TP_Extra_Header, thus resulting in 192-byte source packets. The source packets are written on the multiplexed data. The TP_Extra_Header stores information such as an Arrival_Time_Stamp (ATS). The ATS shows a transfer start time at which each of the TS packets is to be transferred to a PID filter. The source packets are arranged in the multiplexed data as shown at the bottom of FIG. 24. The numbers incrementing from the head of the multiplexed data are called source packet numbers (SPNs).

Each of the TS packets included in the multiplexed data includes not only streams of audio, video, subtitles and others, but also a Program Association Table (PAT), a Program Map Table (PMT), and a Program Clock Reference (PCR). The PAT shows what a PID in a PMT used in the multiplexed data indicates, and a PID of the PAT itself is registered as zero. The PMT stores PIDs of the streams of video, audio, subtitles and others included in the multiplexed data, and attribute information of the streams corresponding to the PIDs. The PMT also has various descriptors relating to the multiplexed data. The descriptors have information such as copy control information showing whether copying of the multiplexed data is permitted or not. The PCR stores STC time information corresponding to an ATS showing when the PCR packet is transferred to a decoder, in order to achieve synchronization between an Arrival Time Clock (ATC) that is a time axis of ATSs, and an System Time Clock (STC) that is a time axis of PTSs and DTSs.

Figure 25:
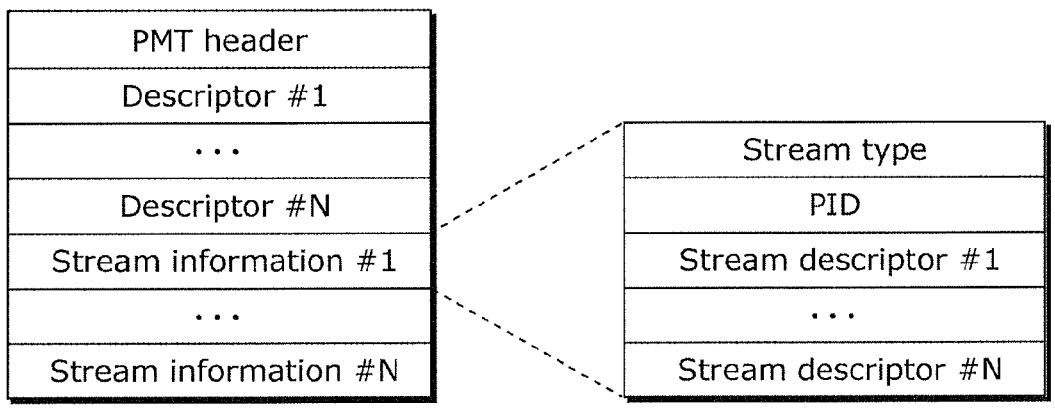
FIG. 25 shows a data structure of a PMT.

FIG. 25 illustrates the data structure of the PMT in detail. A PMT header is disposed at the top of the PMT. The PMT header describes the length of data included in the PMT and others. A plurality of descriptors relating to the multiplexed data is disposed after the PMT header. Information such as the copy control information is described in the descriptors. After the descriptors, a plurality of pieces of stream information relating to the streams included in the multiplexed data is disposed. Each piece of stream information includes stream descriptors each describing information, such as a stream type for identifying a compression codec of a stream, a stream PID, and stream attribute information (such as a frame rate or an aspect ratio). The stream descriptors are equal in number to the number of streams in the multiplexed data.

When the multiplexed data is recorded on a recording medium and others, it is recorded together with multiplexed data information files.

Figure 26:
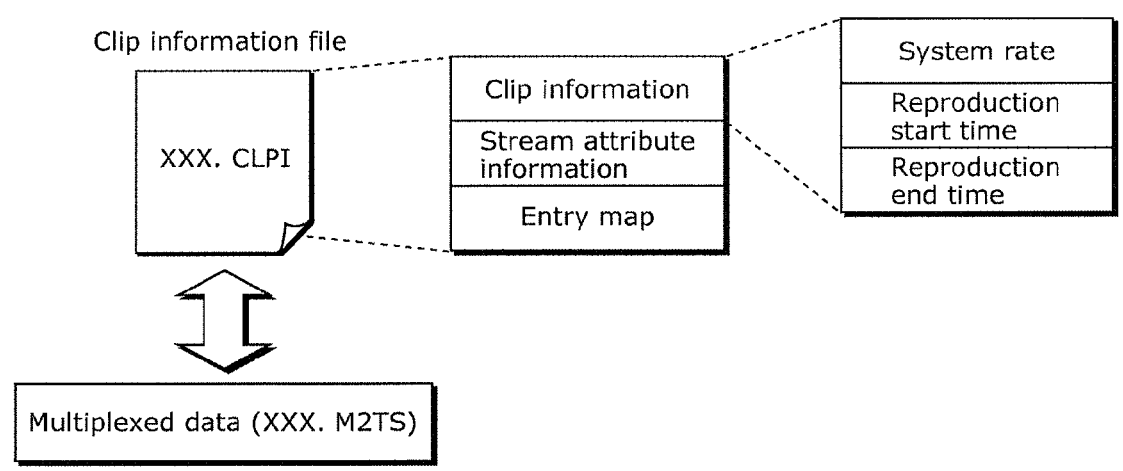
FIG. 26 shows an internal structure of multiplexed data information.

Each of the multiplexed data information files is management information of the multiplexed data as shown in FIG. 26. The multiplexed data information files are in one to one correspondence with the multiplexed data, and each of the files includes multiplexed data information, stream attribute information, and an entry map.

As illustrated in FIG. 26, the multiplexed data includes a system rate, a reproduction start time, and a reproduction end time. The system rate indicates the maximum transfer rate at which a system target decoder to be described later transfers the multiplexed data to a PID filter. The intervals of the ATSs included in the multiplexed data are set to not higher than a system rate. The reproduction start time indicates a PTS in a video frame at the head of the multiplexed data. An interval of one frame is added to a PTS in a video frame at the end of the multiplexed data, and the PTS is set to the reproduction end time.

Figure 27:
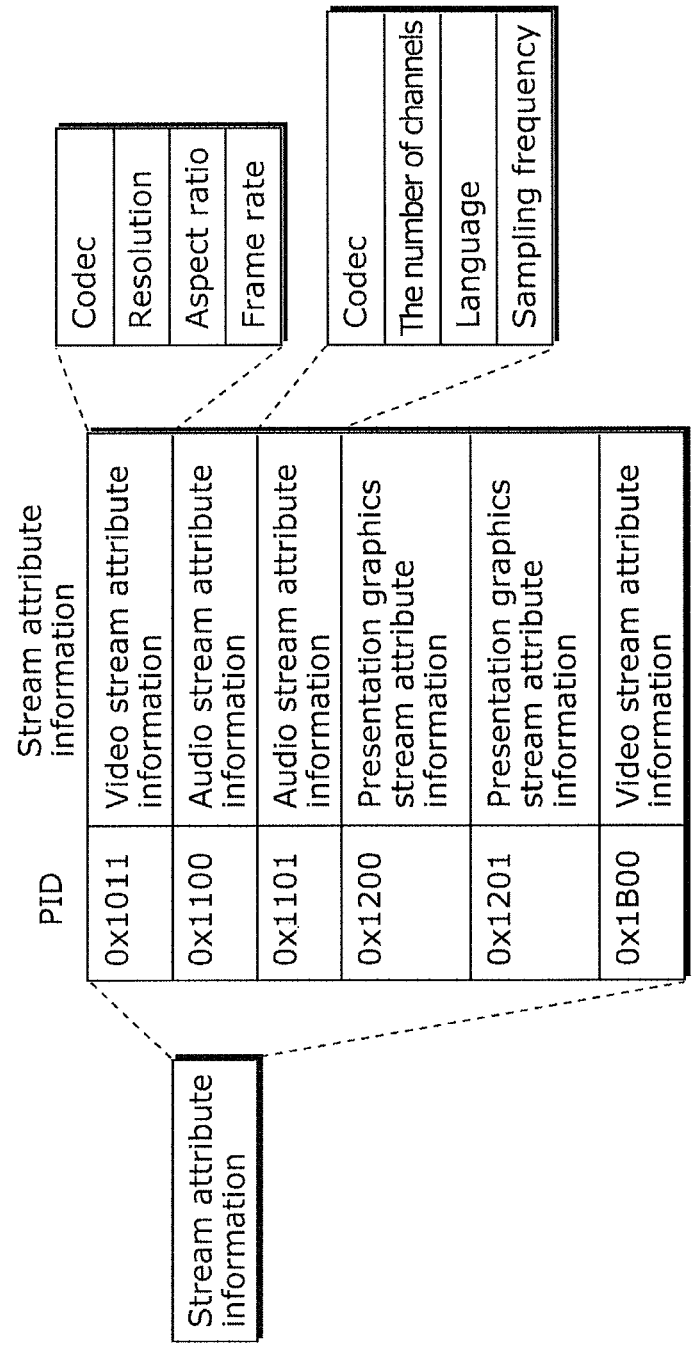
FIG. 27 shows an internal structure of stream attribute information.

As shown in FIG. 27, a piece of attribute information is registered in the stream attribute information, for each PID of each stream included in the multiplexed data. Each piece of attribute information has different information depending on whether the corresponding stream is a video stream, an audio stream, a presentation graphics stream, or an interactive graphics stream. Each piece of video stream attribute information carries information including what kind of compression codec is used for compressing the video stream, and the resolution, aspect ratio and frame rate of the pieces of picture data that is included in the video stream. Each piece of audio stream attribute information carries information including what kind of compression codec is used for compressing the audio stream, how many channels are included in the audio stream, which language the audio stream supports, and how high the sampling frequency is. The video stream attribute information and the audio stream attribute information are used for initialization of a decoder before the player plays back the information.

In Embodiment 5, the multiplexed data to be used is of a stream type included in the PMT. Furthermore, when the multiplexed data is recorded on a recording medium, the video stream attribute information included in the multiplexed data information is used. More specifically, the moving picture coding method or the moving picture coding apparatus described in each of Embodiments includes a step or a unit for allocating unique information indicating video data generated by the moving picture coding method or the moving picture coding apparatus in each of Embodiments, to the stream type included in the PMT or the video stream attribute information. With the configuration, the video data generated by the moving picture coding method or the moving picture coding apparatus described in each of Embodiments can be distinguished from video data that conforms to another standard.

Figure 28:
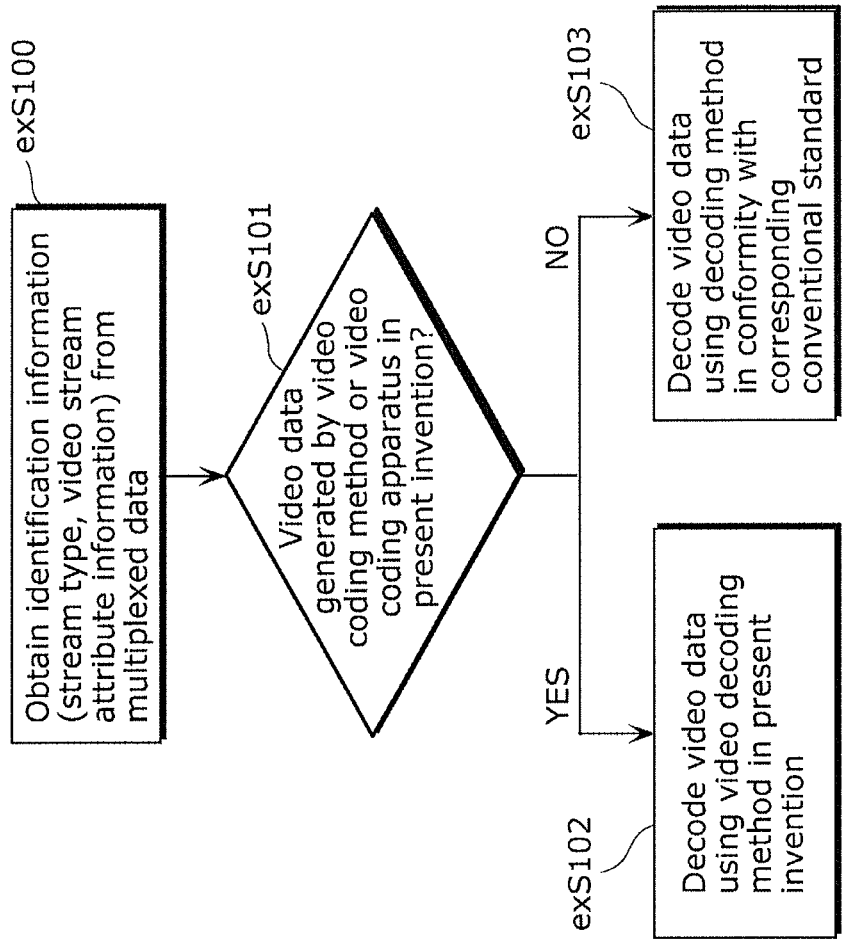
FIG. 28 shows steps for identifying video data.

Furthermore, FIG. 28 illustrates steps of the moving picture decoding method according to Embodiment 5. In Step exS100, the stream type included in the PMT or the video stream attribute information is obtained from the multiplexed data. Next, in Step exS101, it is determined whether or not the stream type or the video stream attribute information indicates that the multiplexed data is generated by the moving picture coding method or the moving picture coding apparatus in each of Embodiments. When it is determined that the stream type or the video stream attribute information indicates that the multiplexed data is generated by the moving picture coding method or the moving picture coding apparatus in each of Embodiments, in Step exS102, decoding is performed by the moving picture decoding method in each of Embodiments. Furthermore, when the stream type or the video stream attribute information indicates conformance to the conventional standards, such as MPEG-2, MPEG4-AVC, and VC-1, in Step exS103, decoding is performed by a moving picture decoding method in conformity with the conventional standards.

As such, allocating a new unique value to the stream type or the video stream attribute information enables determination whether or not the moving picture decoding method or the moving picture decoding apparatus that is described in each of Embodiments can perform decoding. Even when multiplexed data that conforms to a different standard, an appropriate decoding method or apparatus can be selected. Thus, it becomes possible to decode information without any error. Furthermore, the moving picture coding method or apparatus, or the moving picture decoding method or apparatus in Embodiment 5 can be used in the devices and systems described above.

Embodiment 6

Figure 29:
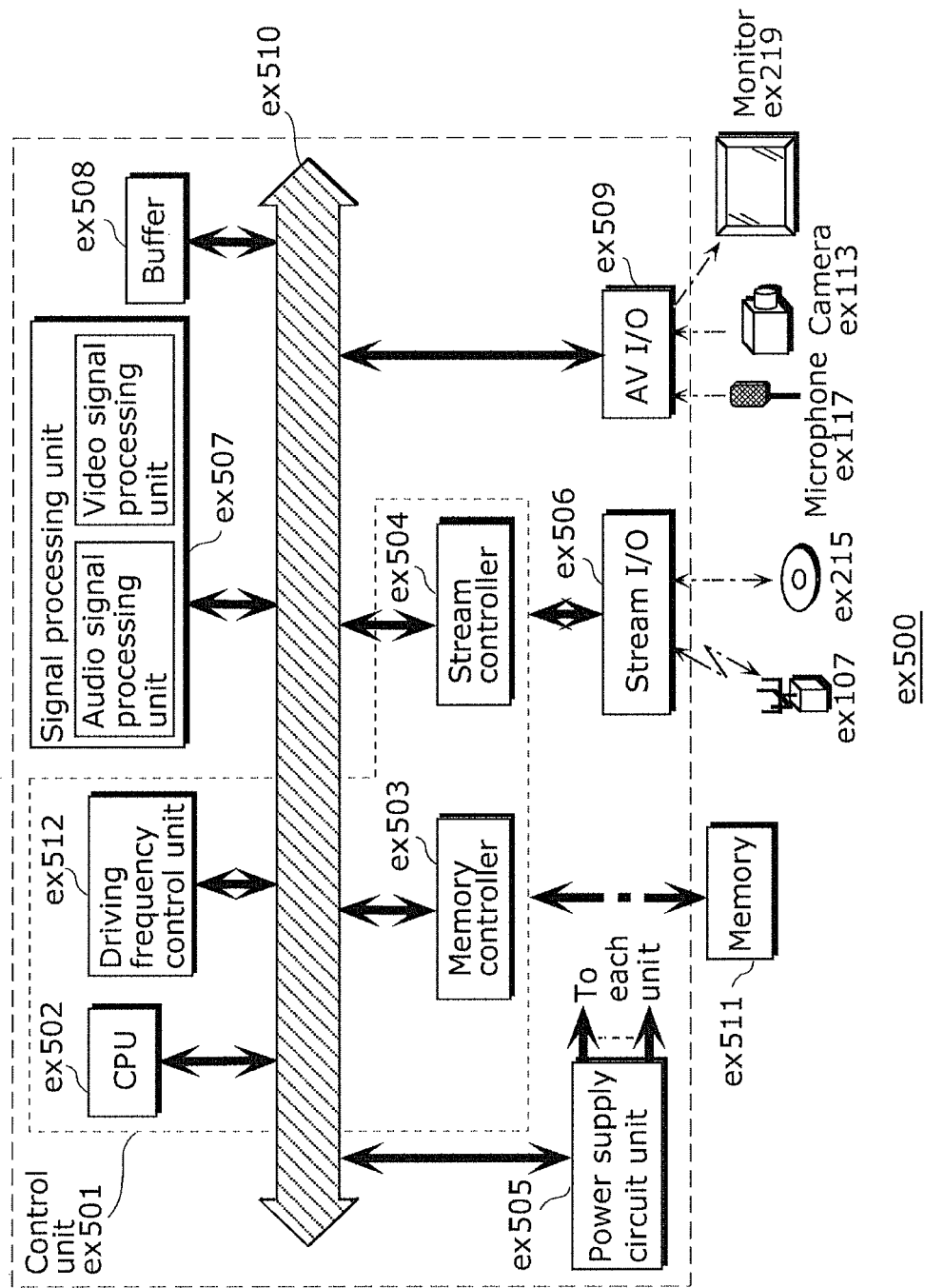
FIG. 29 is a block diagram illustrating an example of a configuration of an integrated circuit for implementing the moving picture coding method and the moving picture decoding method according to each of Embodiments.

Each of the moving picture coding method, the moving picture coding apparatus, the moving picture decoding method, and the moving picture decoding apparatus in each of Embodiments is typically achieved in the form of an integrated circuit or a Large Scale Integrated (LSI) circuit. As an example of the LSI, FIG. 29 illustrates a configuration of the LSI ex500 that is made into one chip. The LSI ex500 includes elements ex501, ex502, ex503, ex504, ex505, ex506, ex507, ex508, and ex509 to be described below, and the elements are connected to each other through a bus ex510. The power supply circuit unit ex505 is activated by supplying each of the elements with power when the power supply circuit unit ex505 is turned on.

For example, when coding is performed, the LSI ex500 receives an AV signal from a microphone ex117, a camera ex113, and others through an AV 10 ex509 under control of a control unit ex501 including a CPU ex502, a memory controller ex503, a stream controller ex504, and a driving frequency control unit ex512. The received AV signal is temporarily stored in an external memory ex511, such as an SDRAM. Under control of the control unit ex501, the stored data is segmented into data portions according to the processing amount and speed to be transmitted to a signal processing unit ex507. Then, the signal processing unit ex507 codes an audio signal and/or a video signal. Here, the coding of the video signal is the coding described in each of Embodiments. Furthermore, the signal processing unit ex507 sometimes multiplexes the coded audio data and the coded video data, and a stream IO ex506 provides the multiplexed data outside. The provided multiplexed data is transmitted to the base station ex107, or written on the recording media ex215. When data sets are multiplexed, the data should be temporarily stored in the buffer ex508 so that the data sets are synchronized with each other.

Although the memory ex511 is an element outside the LSI ex500, it may be included in the LSI ex500. The buffer ex508 is not limited to one buffer, but may be composed of buffers. Furthermore, the LSI ex500 may be made into one chip or a plurality of chips.

Furthermore, although the control unit ex501 includes the CPU ex502, the memory controller ex503, the stream controller ex504, the driving frequency control unit ex512, the configuration of the control unit ex501 is not limited to such. For example, the signal processing unit ex507 may further include a CPU. Inclusion of another CPU in the signal processing unit ex507 can improve the processing speed. Furthermore, as another example, the CPU ex502 may serve as or be a part of the signal processing unit ex507, and, for example, may include an audio signal processing unit. In such a case, the control unit ex501 includes the signal processing unit ex507 or the CPU ex502 including a part of the signal processing unit ex507.

The name used here is LSI, but it may also be called IC, system LSI, super LSI, or ultra LSI depending on the degree of integration.

Moreover, ways to achieve integration are not limited to the LSI, and a special circuit or a general purpose processor and so forth can also achieve the integration. Field Programmable Gate Array (FPGA) that can be programmed after manufacturing LSIs or a reconfigurable processor that allows re-configuration of the connection or configuration of an LSI can be used for the same purpose.

In the future, with advancement in semiconductor technology, a brand-new technology may replace LSI. The functional blocks can be integrated using such a technology. The possibility is that the present invention is applied to biotechnology.

Embodiment 7

When video data generated in the moving picture coding method or by the moving picture coding apparatus described in each of Embodiments is decoded, compared to when video data that conforms to a conventional standard, such as MPEG-2, MPEG4-AVC, and VC-1 is decoded, the processing amount probably increases. Thus, the LSI ex500 needs to be set to a driving frequency higher than that of the CPU ex502 to be used when video data in conformity with the conventional standard is decoded. However, when the driving frequency is set higher, there is a problem that the power consumption increases.

Figure 30:
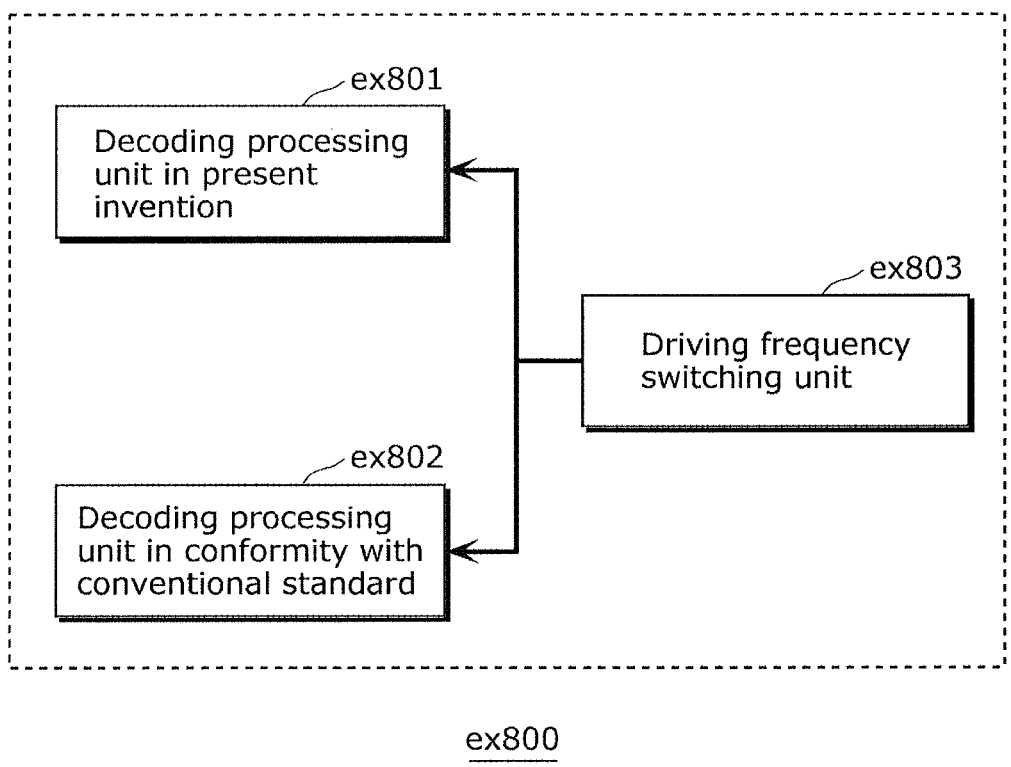
FIG. 30 shows a configuration for switching between driving frequencies.

In order to solve the problem, the moving picture decoding apparatus, such as the television ex300 and the LSI ex500 is configured to determine to which standard the video data conforms, and switch between the driving frequencies according to the determined standard. FIG. 30 illustrates a configuration ex800 in Embodiment 7. A driving frequency switching unit ex803 sets a driving frequency to a higher driving frequency when video data is generated by the moving picture coding method or the moving picture coding apparatus described in each of Embodiments. Then, the driving frequency switching unit ex803 instructs a decoding processing unit ex801 that executes the moving picture decoding method described in each of Embodiments to decode the video data. When the video data conforms to the conventional standard, the driving frequency switching unit ex803 sets a driving frequency to a lower driving frequency than that of the video data generated by the moving picture coding method or the moving picture coding apparatus described in each of Embodiments. Then, the driving frequency switching unit ex803 instructs the decoding processing unit ex802 that conforms to the conventional standard to decode the video data.

More specifically, the driving frequency switching unit ex803 includes the CPU ex502 and the driving frequency control unit ex512 in FIG. 29. Here, each of the decoding processing unit ex801 that executes the moving picture decoding method described in each of Embodiments and the decoding processing unit ex802 that conforms to the conventional standard corresponds to the signal processing unit ex507 in FIG. 29. The CPU ex502 determines to which standard the video data conforms. Then, the driving frequency control unit ex512 determines a driving frequency based on a signal from the CPU ex502. Furthermore, the signal processing unit ex507 decodes the video data based on the signal from the CPU ex502. For example, the identification information described in Embodiment 5 is probably used for identifying the video data. The identification information is not limited to the one described in Embodiment 5 but may be any information as long as the information indicates to which standard the video data conforms. For example, when which standard video data conforms to can be determined based on an external signal for determining that the video data is used for a television or a disk, etc., the determination may be made based on such an external signal. Furthermore, the CPU ex502 selects a driving frequency based on, for example, a look-up table in which the standards of the video data are associated with the driving frequencies as shown in FIG. 32. The driving frequency can be selected by storing the look-up table in the buffer ex508 and in an internal memory of an LSI, and with reference to the look-up table by the CPU ex502.

Figure 31:
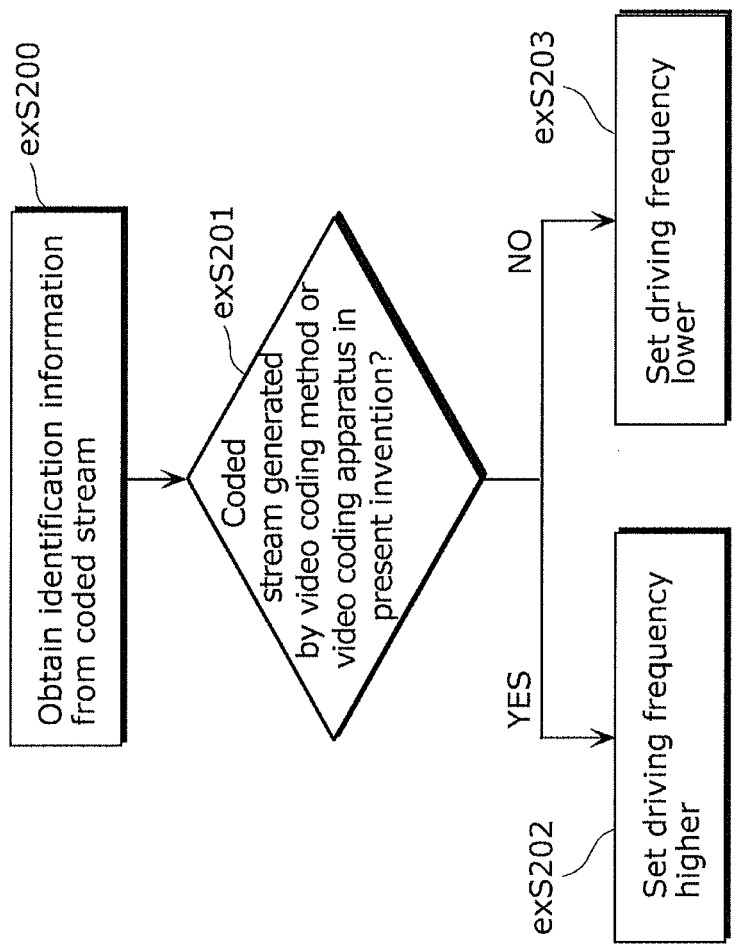
FIG. 31 shows steps for identifying video data and switching between driving frequencies.
Figure 34:
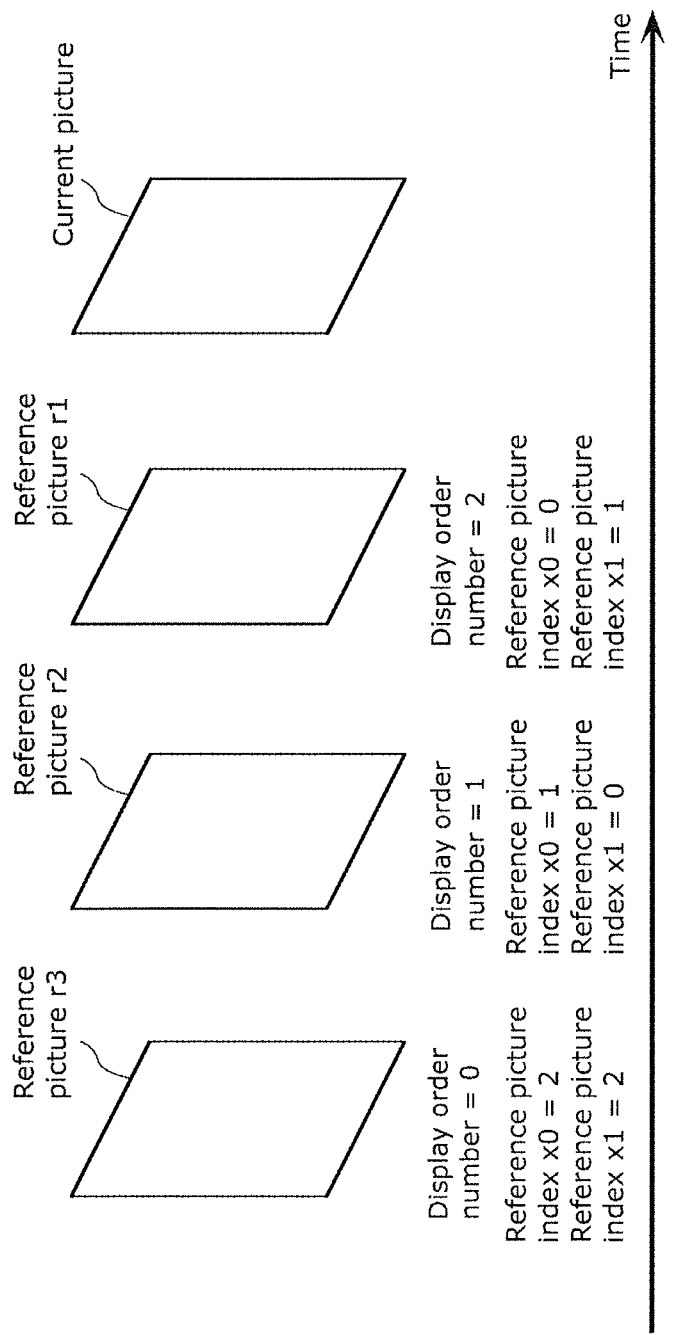
FIG. 34 is a diagram showing an example of reference picture lists.

FIG. 31 illustrates steps for executing a method in Embodiment 7. First, in Step exS200, the signal processing unit ex507 obtains identification information from the multiplexed data. Next, in Step exS201, the CPU ex502 determines whether or not the video data is generated by the coding method and the coding apparatus described in each of Embodiments, based on the identification information. When the video data is generated by the coding method and the coding apparatus described in each of Embodiments, in Step exS202, the CPU ex502 transmits a signal for setting the driving frequency to a higher driving frequency to the driving frequency control unit ex512. Then, the driving frequency control unit ex512 sets the driving frequency to the higher driving frequency. On the other hand, when the identification information indicates that the video data conforms to the conventional standard, such as MPEG-2, MPEG4-AVC, and VC-1, in Step exS203, the CPU ex502 transmits a signal for setting the driving frequency to a lower driving frequency to the driving frequency control unit ex512. Then, the driving frequency control unit ex512 sets the driving frequency to the lower driving frequency than that in the case where the video data is generated by the moving picture coding method and the moving picture coding apparatus described in each of Embodiment.

Furthermore, along with the switching of the driving frequencies, the power conservation effect can be improved by changing the voltage to be applied to the LSI ex500 or an apparatus including the LSI ex500. For example, when the driving frequency is set lower, the voltage to be applied to the LSI ex500 or the apparatus including the LSI ex500 is probably set to a voltage lower than that in the case where the driving frequency is set higher.

Furthermore, when the processing amount for decoding is larger, the driving frequency may be set higher, and when the processing amount for decoding is smaller, the driving frequency may be set lower as the method for setting the driving frequency. Thus, the setting method is not limited to the ones described above. For example, when the processing amount for decoding video data in conformity with MPEG-AVC is larger than the processing amount for decoding video data generated by the moving picture coding method and the moving picture coding apparatus described in each of Embodiments, the driving frequency is probably set in reverse order to the setting described above.

Furthermore, the method for setting the driving frequency is not limited to the method for setting the driving frequency lower. For example, when the identification information indicates that the video data is generated by the moving picture coding method and the moving picture coding apparatus described in each of Embodiments, the voltage to be applied to the LSI ex500 or the apparatus including the LSI ex500 is probably set higher. When the identification information indicates that the video data conforms to the conventional standard, such as MPEG-2, MPEG4-AVC, and VC-1, the voltage to be applied to the LSI ex500 or the apparatus including the LSI ex500 is probably set lower. As another example, when the identification information indicates that the video data is generated by the moving picture coding method and the moving picture coding apparatus described in each of Embodiments, the driving of the CPU ex502 does not probably have to be suspended. When the identification information indicates that the video data conforms to the conventional standard, such as MPEG-2, MPEG4-AVC, and VC-1, the driving of the CPU ex502 is probably suspended at a given time because the CPU ex502 has extra processing capacity. Even when the identification information indicates that the video data is generated by the moving picture coding method and the moving picture coding apparatus described in each of Embodiments, in the case where the CPU ex502 has extra processing capacity, the driving of the CPU ex502 is probably suspended at a given time. In such a case, the suspending time is probably set shorter than that in the case where when the identification information indicates that the video data conforms to the conventional standard, such as MPEG-2, MPEG4-AVC, and VC-1.

Accordingly, the power conservation effect can be improved by switching between the driving frequencies in accordance with the standard to which the video data conforms. Furthermore, when the LSI ex500 or the apparatus including the LSI ex500 is driven using a battery, the battery life can be extended with the power conservation effect.

Embodiment 8

There are cases where a plurality of video data that conforms to different standards, is provided to the devices and systems, such as a television and a mobile phone. In order to enable decoding the plurality of video data that conforms to the different standards, the signal processing unit ex507 of the LSI ex500 needs to conform to the different standards. However, the problems of increase in the scale of the circuit of the LSI ex500 and increase in the cost arise with the individual use of the signal processing units ex507 that conform to the respective standards.

In order to solve the problem, what is conceived is a configuration in which the decoding processing unit for implementing the moving picture decoding method described in each of Embodiments and the decoding processing unit that conforms to the conventional standard, such as MPEG-2, MPEG4-AVC, and VC-1 are partly shared. Ex900 in FIG. 33A shows an example of the configuration. For example, the moving picture decoding method described in each of Embodiments and the moving picture decoding method that conforms to MPEG4-AVC have, partly in common, the details of processing, such as entropy coding, inverse quantization, deblocking filtering, and motion compensated prediction. The details of processing to be shared probably include use of a decoding processing unit ex902 that conforms to MPEG4-AVC. In contrast, a dedicated decoding processing unit ex901 is probably used for other processing that does not conform to MPEG4-AVC and is unique to the present invention. Since the present invention is characterized by motion compensated prediction in particular, for example, the dedicated decoding processing unit ex901 is used for motion compensated prediction. Otherwise, the decoding processing unit is probably shared for one of the entropy coding, deblocking filtering, and inverse quantization, or all of the processing. The decoding processing unit for implementing the moving picture decoding method described in each of Embodiments may be shared for the processing to be shared, and a dedicated decoding processing unit may be used for processing unique to that of MPEG4-AVC.

Furthermore, ex1000 in FIG. 33B shows another example in that processing is partly shared. This example uses a configuration including a dedicated decoding processing unit ex1001 that supports the processing unique to the present invention, a dedicated decoding processing unit ex1002 that supports the processing unique to another conventional standard, and a decoding processing unit ex1003 that supports processing to be shared between the moving picture decoding method in the present invention and the conventional moving picture decoding method. Here, the dedicated decoding processing units ex1001 and ex1002 are not necessarily specialized for the processing of the present invention and the processing of the conventional standard, respectively, and may be the ones capable of implementing general processing. Furthermore, the configuration of Embodiment 8 can be implemented by the LSI ex500.

As such, reducing the scale of the circuit of an LSI and reducing the cost are possible by sharing the decoding processing unit for the processing to be shared between the moving picture decoding method in the present invention and the moving picture decoding method in conformity with the conventional standard.

INDUSTRIAL APPLICABILITY

The image coding method and the image decoding method according to the present invention are applicable to, for example, televisions, digital video recorders, car navigation systems, mobile phones, digital cameras, digital video cameras, and so on.

REFERENCE SIGNS LIST

102 Subtraction unit
103 Orthogonal transform unit
104 Quantization unit
105 Variable length coding unit 106, 206 Inverse quantization unit
107, 207 Inverse orthogonal transform unit
108, 208 Addition unit
109, 209 Block memory
110, 210 Intra prediction unit
111, 211 Frame memory
112, 212 Inter prediction unit
113, 213 Switch unit
121, 221 Inter prediction control unit
122, 222 Temporal merge motion vector calculation unit
123 Co-located reference direction determination unit
124 Picture type determination unit
125, 225 ColPic memory
205 Variable length decoding unit

The invention claimed is:

1. An image coding method of coding a current block to be coded using a first reference index and a first motion vector, the first reference index indicating a first reference picture, the image coding method comprising:

calculating, using a second reference index and a second motion vector, a third reference index and a third motion vector as respective first candidates for the first reference index and the first motion vector, the second reference index and the second motion vector being used to code a corresponding block that is included in a corresponding picture different from a current picture to be coded and whose position in the corresponding picture matches a position of the current block in the current picture;

determining a value of a flag that indicates whether or not to code the current block using the third reference index and the third motion vector as the first reference index and the first motion vector; and coding the current block using the first reference index and the first motion vector according to the value of the flag, and adding the value of the flag to a bitstream generated by the coding, wherein in the case where a second reference picture indicated by the second reference index is not included in a reference picture list, a prediction direction from the current picture to the corresponding picture cannot be used.

2. The image coding method according to claim 1, further comprising calculating second candidates for the first reference index and the first motion vector from an adjacent block that is a block included in the current picture and adjacent to the current block, wherein the flag indicates whether or not to code the current block using, as the first reference index and the first motion vector, the third reference index and the third motion vector among a plurality of candidates including the first candidates and the second candidates.

3. The image coding method according to claim 1, wherein the calculating includes:

determining whether or not the second reference picture indicated by the second reference index is included in the reference picture list of the current picture;

copying, to the third reference index, a fourth reference index indicating the second reference picture in the reference picture list, in the case where the second reference picture is included in the reference picture list;

setting the third reference index to a maximum value assignable in the reference picture list, in the case where the second reference picture is not included in the reference picture list; and calculating the third motion vector by scaling the second motion vector using a display order number of the current picture, a display order number of the corresponding picture, a display order number of the second reference picture, and a display order number of a third reference picture indicated by the third reference index.

4. An image decoding method of decoding a current block to be decoded using a first reference index and a first motion vector, the first reference index indicating a first reference picture, the image decoding method comprising:

calculating, using a second reference index and a second motion vector, a third reference index and a third motion vector as respective first candidates for the first reference index and the first motion vector, the second reference index and the second motion vector being used to decode a corresponding block that is included in a corresponding picture different from a current picture to be decoded and whose position in the corresponding picture matches a position of the current block in the current picture;

obtaining, from a bitstream, a value of a flag that indicates whether or not to decode the current block using the third reference index and the third motion vector as the first reference index and the first motion vector; and decoding the current block using the first reference index and the first motion vector according to the value of the flag, wherein in the case where a second reference picture indicated by the second reference index is not included in a reference picture list, a prediction direction from the current picture to the corresponding picture cannot be used.

5. The image decoding method according to claim 4, further comprising calculating second candidates for the first reference index and the first motion vector from an adjacent block that is a block included in the current picture and adjacent to the current block, wherein the flag indicates whether or not to decode the current block using, as the first reference index and the first motion vector, the third reference index and the third motion vector among a plurality of candidates including the first candidates and the second candidates.

6. The image decoding method according to claim 4, wherein the calculating includes:

determining whether or not the second reference picture indicated by the second reference index is included in the reference picture list of the current picture;

copying, to the third reference index, a fourth reference index indicating the second reference picture in the reference picture list, in the case where the second reference picture is included in the reference picture list;

setting the third reference index to a maximum value assignable in the reference picture list, in the case where the second reference picture is not included in the reference picture list; and calculating the third motion vector by scaling the second motion vector using a display order number of the current picture, a display order number of the corresponding picture, a display order number of the second reference picture, and a display order number of a third reference picture indicated by the third reference index.

* * * * *

UNITED STATES PATENT AND TRADEMARK OFFICE
CERTIFICATE OF CORRECTION

PATENT NO. : 9,560,352 B2  
APPLICATION NO. : 13/980918  
DATED : January 31, 2017  
INVENTOR(S) : Toshiyasu Sugio et al.

Page 1 of 1

It is certified that error appears in the above-identified patent and that said Letters Patent is hereby corrected as shown below:

On the Title Page

Please insert -- (60) Provisional Application No. 61/437,128, filed on January 28, 2011 --

Signed and Sealed this  
Sixteenth Day of May, 2017

Michelle K. Lee  
*Director of the United States Patent and Trademark Office*